US011242277B2

(12) United States Patent
    Agrawal et al.

(10) Patent No.: US 11,242,277 B2
(45) Date of Patent: Feb. 8, 2022

(54) METHOD OF PRODUCING SOOT

(71) Applicant: CORNING INCORPORATED, Corning, NY (US)

(72) Inventors: Manoj Agrawal, Wilmington, NC (US); Dale Robert Powers, Painted Post, NY (US); Fei Xia, New York, NY (US)

(73) Assignee: Corning Incorporated, Corning, NY (US)

( * ) Notice: Subject to any disclaimer, the term of this patent is extended or adjusted under 35 U.S.C. 154(b) by 144 days.

(21) Appl. No.: 16/541,773

(22) Filed: Aug. 15, 2019

(65) Prior Publication Data

US 2020/0062635 A1     Feb. 27, 2020

Related U.S. Application Data

(60) Provisional application No. 62/720,479, filed on Aug. 21, 2018.

(51) Int. Cl.
    *C03B 7/14*            (2006.01)
    *C03B 37/014*        (2006.01)
    *F23D 14/02*         (2006.01)
    *F23D 14/58*         (2006.01)

(52) U.S. Cl.
    CPC .......... *C03B 37/0142* (2013.01); *F23D 14/02* (2013.01); *F23D 14/58* (2013.01); *F23L 2900/07002* (2013.01)

(58) Field of Classification Search
None
See application file for complete search history.

(56) References Cited

U.S. PATENT DOCUMENTS

| | | | |
|---|---|---|---|
| 5,203,897 A * | 4/1993 | Powers ............. | C03B 37/01413 65/144 |
| 5,599,371 A | 2/1997 | Cain et al. | |
| 5,922,100 A | 7/1999 | Cain et al. | |
| 6,751,987 B1 * | 6/2004 | Ball ................... | C03B 19/1423 239/270 |

(Continued)

FOREIGN PATENT DOCUMENTS

EP            1035078 A2      9/2000

OTHER PUBLICATIONS

International Search Report and Written Opinion of the European International Searching Authority; PCT/US2019/046839; dated Nov. 8, 2019; 13 Pgs.

(Continued)

*Primary Examiner* — Jason Lau
(74) *Attorney, Agent, or Firm* — Kevin L. Bray

(57) ABSTRACT

A method of producing soot, including: combusting a first fuel stream and a first oxidizer at a burner face; combusting a second fuel stream and a second oxidizer at the burner face, wherein the second fuel stream and the second oxidizer are premixed in advance of the burner face and a second equivalence ratio of the second fuel stream and the second oxidizer is less than about 1; and combusting a silicon-containing fuel into a plurality of soot particles, wherein the second fuel stream and the second oxidizer are combusted between the first fuel stream and the silicon-containing fuel. Applying this method of producing soot to deposit a preform suitable for the manufacture of optical fibers.

21 Claims, 12 Drawing Sheets

(56) References Cited

U.S. PATENT DOCUMENTS

| | | | | |
|---|---|---|---|---|
| 2003/0200770 A1* | 10/2003 | Johnson | ............. | C03B 37/0142 |
| | | | | 65/397 |
| 2005/0223750 A1* | 10/2005 | Nutini | ................ | C03B 37/0142 |
| | | | | 65/413 |
| 2011/0314868 A1* | 12/2011 | Miyasaka | ........... | C03B 19/1423 |
| | | | | 65/17.4 |
| 2015/0033799 A1 | 2/2015 | Ishihara et al. | | |
| 2016/0168007 A1* | 6/2016 | Groh | ................ | C03B 37/01225 |
| | | | | 65/384 |

OTHER PUBLICATIONS

Murata; "Recent Developments in Vapor Phase Axial Deposition"; Journal of Lightwave Technology; vol. LT-4; No. 8; (1986); pp. 1026-1033.

Suda et al; "High-Rate Fabrication of Wholly Synthesised Fibre Preforms by the Multiflame Vad Method Using SiHCl3 Raw Materials"; Electronics Letters; vol. 21; No. 24; (1985) pp. 1123-1124.

Suda et al; ""Double-Flame Vad Process High-Rate Optical Preformfabrication"", Electronics Letters, vol. 21; No. 1; (1985) pp. 29-30.

* cited by examiner

METHOD OF PRODUCING SOOT

This application claims the benefit of priority to U.S. Provisional Application Ser. No. 62/720,479 filed on Aug. 21, 2018, the content of which is relied upon and incorporated herein by reference in its entirety.

FIELD OF THE DISCLOSURE

The present disclosure generally relates to soot production, specifically to methods of producing silica soot and more specifically to deposition of the soot on a substrate.

BACKGROUND

Outside vapor deposition is utilized in the formation of optical fiber preforms. Outside vapor deposition involves the process of combusting one or more silicon-containing fuels to form silica soot. The silica soot is then deposited on a bait rod or core cane to form the optical fiber preform. In conventional outside vapor deposition systems, a jet of the silica soot may be produced under conditions which lead the silica soot to be dispersed. The dispersed silica soot may lead to a lower than ideal efficiency of soot capture. The dispersion of the silica soot jet may be affected by a variety of properties related to the combustion of the silicon-containing fuels. Dispersed soot not captured on the bait rod or core cane to form the optical fiber preform is generally either exhausted out of the deposition chamber and captured downstream as a waste material or deposited undesirably on surfaces and components within the deposition chamber, typically requiring time and effort to remove and clean before initiating deposition of the next optical fiber preform. It is therefore generally desirable to minimize both the amount and relative fraction of soot not deposited or captured on the optical fiber preform. Additionally, the process of combusting silicon fuels in the outside vapor deposition process creates audible noise. In a large-scale soot generation operation, it may be desirable to reduce such noise. The magnitude of the audible noise may be affected by a variety of properties related to the combustion of the silicon-containing fuels.

SUMMARY OF THE DISCLOSURE

According to at least one feature of the present disclosure, a method of producing soot, includes: combusting a first fuel stream and a first oxidizer at a burner face; combusting a second fuel stream and a second oxidizer at the burner face, wherein the second fuel stream and the second oxidizer are premixed in advance of the burner face and a second equivalence ratio of the second fuel stream and the second oxidizer is less than about 1; and combusting a silicon-containing fuel into a plurality of soot particles, wherein the second fuel stream and the second oxidizer are combusted between the first fuel stream and the silicon-containing fuel.

According to another feature of the present disclosure, a method of producing soot, includes: combusting a first fuel stream and a first oxidizer at a periphery of a burner face; combusting a second fuel stream and a second oxidizer at the burner face; and combusting a silicon-containing fuel into a plurality of silica soot particles at a lift-off distance away from the burner face, wherein the lift-off distance is from about 0.1 cm to about 0.8 cm from the burner face.

According to another feature of the present disclosure, a method of producing soot, includes: combusting a first fuel stream and a first oxidizer at a burner face, wherein a first equivalence ratio of the first fuel stream and the first oxidizer is greater than about 1.6; combusting a second fuel stream and a second oxidizer at the burner face, wherein a second equivalence ratio of the second fuel stream and the second oxidizer is from about 0.1 to about 0.5; and combusting a silicon-containing fuel into a plurality of silica soot particles at a lift-off distance away from the burner face, wherein the lift-off distance is from about 0.1 cm to about 0.8 cm from the burner face.

The present disclosure extends to:

A method of producing soot, comprising:

combusting a first fuel stream and a first oxidizer at a burner face;

combusting a second fuel stream and a second oxidizer at the burner face, wherein the second fuel stream and the second oxidizer are premixed in advance of the burner face and a second equivalence ratio of the second fuel stream and the second oxidizer is less than about 1; and combusting a silicon-containing fuel into a plurality of soot particles, wherein the second fuel stream and the second oxidizer are combusted between the first fuel stream and the silicon-containing fuel.

The present disclosure extends to:

A method of producing soot, comprising:

combusting a first fuel stream and a first oxidizer at of a burner face;

combusting a second fuel stream and a second oxidizer at the burner face; and combusting a silicon-containing fuel into a plurality of silica soot particles at a lift-off distance away from the burner face, wherein the lift-off distance is from about 0.1 cm to about 0.8 cm from the burner face and wherein the second fuel stream is combusted between the first fuel stream and the silicon-containing fuel.

The present disclosure extends to:

A flame comprising the combustion product of an organosilicon compound, the flame having an ignition point situated at a lift-off distance from a face of a burner, the lift-off distance being in the range from 0.1 cm-0.8 cm.

These and other features, advantages, and objects of the present disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1A:
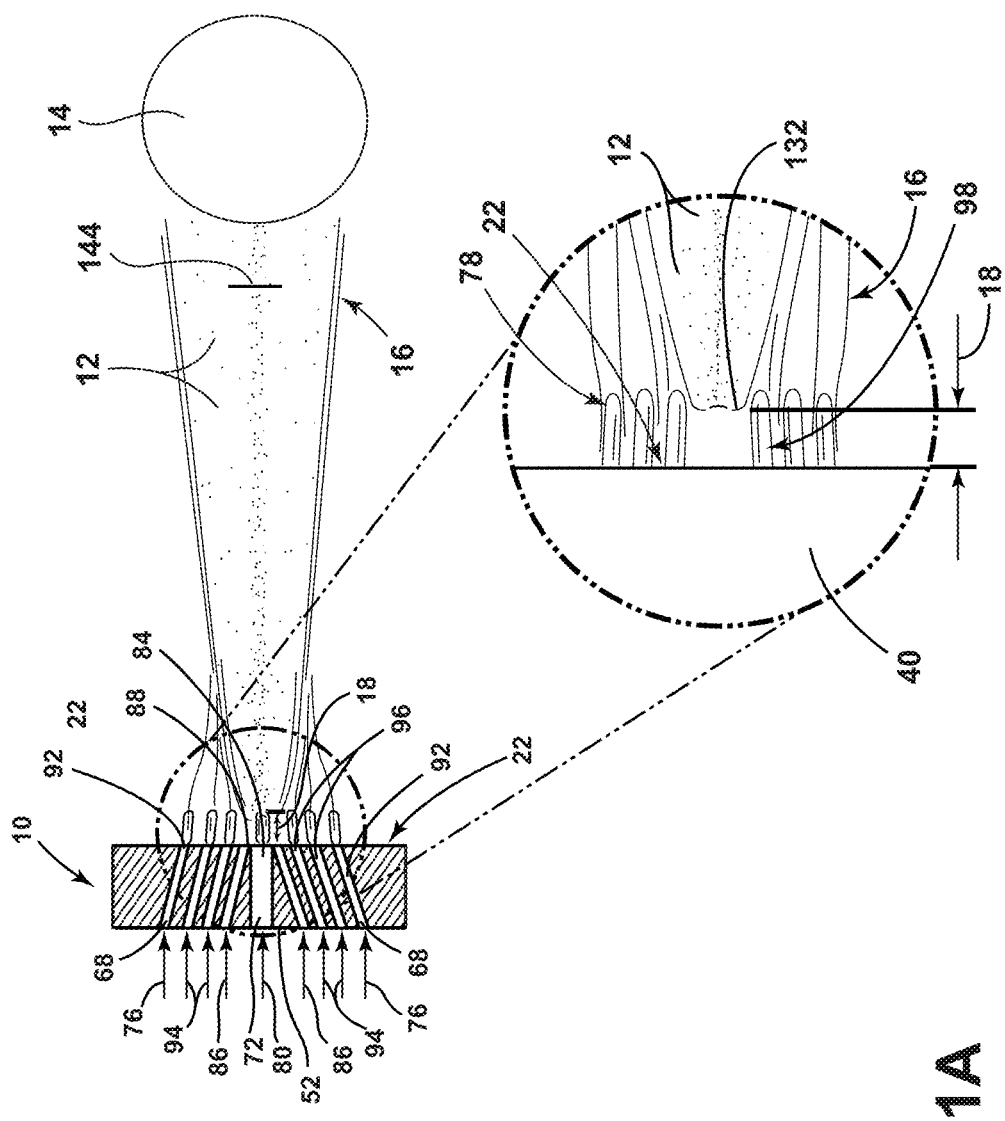
FIG. 1A is a cross-sectional view of a burner in operation.

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Figure 1B:
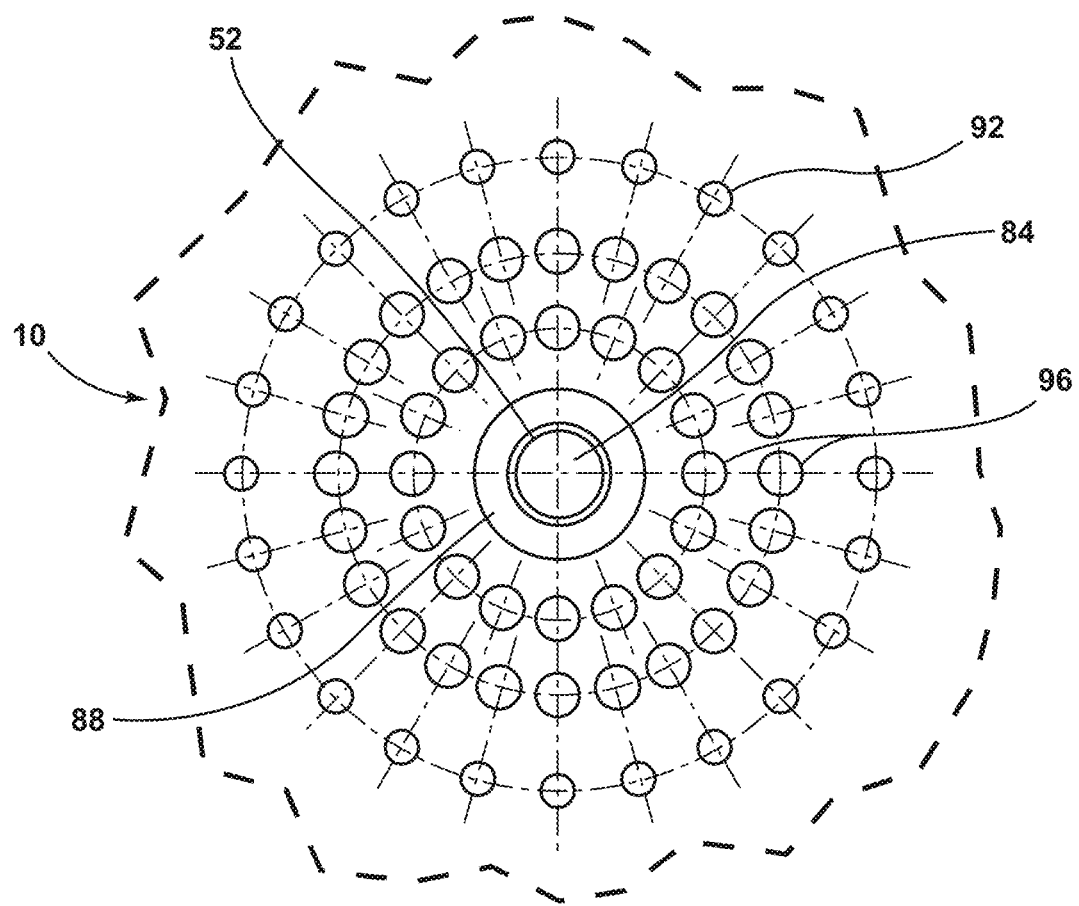
FIG. 1B is a view of the face of the burner.

Referring now to FIG. 1A and FIG. 1B, depicted is a burner 10. According to various examples, the burner 10 may be utilized in outside vapor deposition (OVD) of silica soot particles 12 on a substrate 14. The substrate 14 may be a bait rod, a soot preform, a core cane, other components of an optical fiber preform, components of a glass article, or combinations thereof. As such, the burner 10 may be utilized in the formation of an optical fiber preform. In operation, the burner 10 is configured to burn or oxidize a silicon-containing fuel to produce the silica soot particles 12 in a soot stream 16. The soot stream 16 is expelled toward the substrate 14 such that the silica soot particles 12 are deposited on the substrate 14. The ignition of the silicon-containing fuel may occur at a lift-off distance 18 from a burner face 22 of the burner 10. (See also inset 40.)

The first gas aperture 68 receives the first gas 76 which may include a first oxidizer and/or a first fuel stream. According to various examples, the first gas 76 may be premixed prior to reaching the burner face 22 of the burner 10. In other words, the first fuel stream and the first oxidizer may be premixed in advance of the burner face 22 of the burner 10. For purposes of this disclosure, the term "premixed" means that two or more constituents (e.g., the first fuel stream and the first oxidizer) are substantially homogeneously mixed prior to exiting burner face 22. According to various examples, the first fuel stream and the first oxidizer are surface mixed at the burner face 22 of the burner 10. In such an example, the first gas 76 is substantially or fully composed of the first fuel stream, and the first oxidizer is mixed with the first fuel stream at the burner face 22 of the burner 10. In surface mixed, or diffusion-mixed, examples, the first oxidizer may be supplied by the ambient environment (e.g., ambient oxygen) or may be provided by separate ports, tubes or openings in the burner face 22 of the burner 10. In surface mixed examples, the first fuel stream and the first oxidizer mix downstream of the burner face 22 and prior to combustion. The first oxidizer may include $O_2$, an oxygen-containing gas (e.g., air), other oxygen-containing compounds, non-oxygen containing compounds (e.g., chlorine and other halide containing compounds) and/or combinations thereof. The first fuel stream may include a first hydrocarbon (e.g., at least one of $CH_4$, $C_2H_6$, $C_3H_8$, $C_4H_{10}$, etc.), $H_2$, CO, other combustible compounds and/or combinations thereof. In a preferred embodiment, the first fuel stream lacks a silicon-containing fuel. As used herein, the term "fuel" encompasses any liquid or gas which can be burned to produce heat, and has a flammable range with air at 20° C. and a standard pressure of 101.3 kPa. Fuels include non-silicon-containing fuels (i.e. fuels that lack Si in the composition) and silicon-containing fuels (i.e. fuels that include Si in the composition).

The fume gas opening 72 of fume tube 52 may be provided with a fume gas 80 including at least one of $O_2$ and $N_2$ (i.e., an inner shield $N_2$ gas) and a silicon-containing fuel. The silicon-containing fuel may include octamethylcyclotetrasiloxane (OMCTS), decamethylcyclopentasiloxane, dodecamethylcyclohexasiloxane, hexamethylcyclotrisiloxane, hexamethyldisiloxane, octamethyltrisiloxane, decamethyltetrasiloxane, dodecamethylpentasiloxane, other silicon-containing fuels and/or combinations thereof. The fume gas 80 exits the burner face 22 through a fume tube aperture 84. In other words, the burner 10 is configured to pass a silicon-containing fuel in the fume gas 80 through the fume tube aperture 84. The fume tube aperture 84 of the fume tube 52 may have a single diameter that extends through the fume tube 52 or the diameter may vary. The fume tube aperture 84 may have a diameter, or longest cross-sectional linear dimension at burner face 22, of about 1.0 mm, or about 1.2 mm, or about 1.4 mm, or about 1.6 mm, or about 1.8 mm, or about 2.0 mm, or about 2.2 mm, or about 2.4 mm, or about 2.6 mm, or about 2.8 mm, or about 3.0 mm, or about 3.2 mm, or about 3.4 mm, or about 3.6 mm, or about 3.8 mm, or about 4.0 mm, or about 5.0 mm, or any and all values and ranges between these values.

A shield gas 86 may be passed through the burner 10. As used herein, "shield gas" refers to a gas that is capable of controlling heat and/or mass transfer between the silicon-containing fuel (e.g. fuel passing through fume tube aperture 84) and other fuel streams delivered through burner face 22. Preferably, the shield gas is delivered at a position between the silicon-containing fuel and the first gas 76. The shield gas 86 may include one or more inert gases (e.g. $N_2$, Ar, Kr). In one embodiment, the shield gas 86 includes a fuel other than a silicon-containing fuel; that is, the shield gas 86 includes a non-silicon-containing fuel and no silicon-containing fuel. In another embodiment, shield gas 86 lacks a fuel. In still another embodiment, shield gas 86 includes a non-silicon-containing fuel and an oxidizer. Examples of non-silicon-containing fuels optionally included in the shield gas 86 include hydrocarbons (e.g. $CH_4$, $C_2H_6$, $C_3H_8$, $C_4H_{10}$, etc.), $H_2$, CO, other combustible compounds and/or combinations thereof. The shield gas 86 is passed through the burner 10 and ultimately exits the burner face 22 through a shield gas aperture 88. The shield gas aperture 88 is preferably positioned such that the burner 10 directs the shield gas 86 between the silicon-containing fuel (passing through fume tube aperture 84) and the combustion of a second fuel stream and a second oxidizer (passing as second gas 94 through secondary tubes 96) as explained in greater detail below. The first gas 76 passes through the burner 10 and ultimately exits the burner face 22 through a plurality of first tubes 92. The first tubes 92 are positioned proximate a circumference of the burner face 22 of the burner 10. The first tubes 92 may be separate structures or may be integrally formed by the components of the burner 10. As such, the first gas 76 including the first oxidizer and first fuel may be passed or combusted at a periphery (outer radial region) of the burner face 22.

A second gas 94 (i.e., sometimes referred to as a supplemental gas) may include a second oxidizer and a second fuel stream. The second oxidizer may include $O_2$, an oxygen-containing gas (e.g., air), other oxygen-containing compounds, non-oxygen containing compounds (e.g., chlorine and other halide containing compounds) and/or combinations thereof. According to various examples, the first and second oxidizers are substantially the same, but it will be understood that the first and second oxidizers may be different. The second fuel stream of the second gas 94 may include at least one of a hydrocarbon (e.g. $CH_4$, $C_2H_6$, $C_3H_8$, $C_4H_{10}$, etc.), $H_2$, CO, other combustible compounds and/or combinations thereof. In a preferred embodiment, the second fuel stream lacks a silicon-containing fuel. According to various examples, the first and second fuel streams may have substantially the same composition, but it will be understood that the first and second fuel streams may be different; that is, the first fuel stream and the second fuel stream differ in composition in one embodiment. The second gas 94 passes through the burner 10 and ultimately exits the burner face 22 through a plurality of secondary tubes 96. According to various examples, the secondary tubes 96 are positioned between the fume tube 52 and the one or more first tubes 92 such that the second gas 94 is passed between the fume gas 80 and the first gas 76 at the burner face 22. As such, the combustion of the second gas 94 may occur between the combustion of the first gas 76 and the combustion of the fume gas 80. Similarly, in embodiments employing a shield gas, delivery of the shield gas 86 may occur between combustion of the first gas 76 and the combustion of the fume gas 80, or between combustion of the second gas 94 and the combustion of the fume gas 80. It will be understood that the constituents of the second gas 94 may be mixed upstream of the burner 10, may be mixed in the burner 10 and/or diffusion-mixed at the burner face 22. In other words, the second fuel stream and the second oxidizer may be premixed or surface mixed in a similar manner to the first fuel stream and the first oxidizer of the first gas 76.

Figure 2:
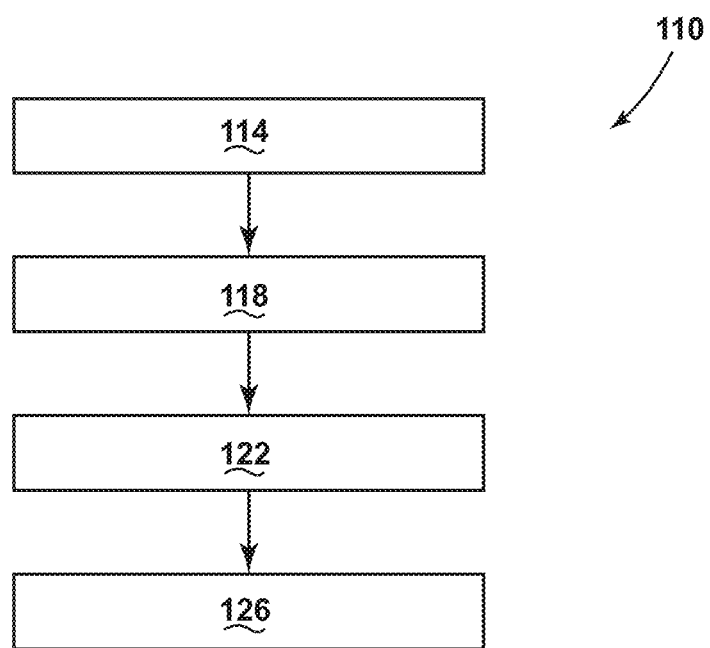
FIG. 2 is a flowchart of a method of producing soot, according to at least one example.

Referring now to FIGS. 1A, 1B, and 2, in operation, the burner 10 may be used in a method 110 of producing silica soot particles 12. It will be understood that the method 110 may also substantially be used for the formation of an optical fiber preform or other substrate 14 which may include silica soot 12. The method 110 may begin with a step 114 of combusting the first fuel stream and the first oxidizer of the first gas 76 at the burner face 22. It will be understood that combustion occurring "at the burner face 22" may start between about 0 mm and about 2 mm from the burner face 22 and extend up to 20 mm from the burner face 22 without departing from the teachings provided herein. According to various examples, a first equivalence ratio of the first fuel stream and the first oxidizer of the first gas 76 is greater than about 1. In order to accomplish step 114, the first gas 76 including the first oxidizer and the first fuel stream is passed or directed through the first tubes 92 of the burner 10 to the burner face 22. Combustion of the first gas 76 forms an outer or first flame 78 at the periphery (outer radial region) of the burner 10. In examples where the combustion of the first fuel stream and the first oxidizer is produced by surface mixing, the first fuel and the first oxidizer may be supplied by separate first tubes 92 or the first oxidizer may be ambient air around the burner 10.

As explained above, the first fuel stream may include a first hydrocarbon (e.g., at least one of $CH_4$, $C_2H_6$, $C_3H_8$, $C_4H_{10}$, etc.), $H_2$, CO, other combustible compounds and/or combinations thereof. The first gas 76 may be combusted such that its combustion ignites the second gas 94 (at the exit of secondary tubes 96) and the fume gas 80 including the silicon-containing fuel. Further, the ignition of the first gas 76 may function as a pilot light for the burner 10.

Flow rates and molar ratios of the first fuel and first oxidizer of the first gas 76 and for the second fuel and second oxidizer of the second gas 94 depend on the compositions of the first fuel, first oxidizer, second fuel and second oxidizer. Representative flow rates based on using methane as the first fuel and oxygen as the first oxidizer follow. One skilled in the art can determine similarly appropriate flow rates and molar ratios for other combinations of fuels and oxidizers.

The first fuel of the first gas 76 may be passed at a flow rate of from about 1 slpm to about 9 slpm, or from about 1.25 slpm to about 8.75 slpm, or from about 1.5 slpm to about 8.5 slpm, or from about 1.75 slpm to about 8.25 slpm, or from about 2.0 slpm to about 8.0 slpm, or from about 2.25 slpm to about 7.75 slpm, or from about 2.5 slpm to about 7.5 slpm, or from about 2.75 slpm to about 7.25 slpm, or from about 3.0 slpm to about 7.0 slpm, or from about 3.25 slpm to about 7.75 slpm, or from about 3.5 slpm to about 7.5 slpm, or from about 3.75 slpm to about 7.25 slpm, or from about 4.0 slpm to about 7.0 slpm, or from about 4.25 slpm to about 6.75 slpm, or from about 4.5 slpm to about 6.5 slpm, or from about 4.75 slpm to about 6.25 slpm, or from about 5.0 slpm to about 6.0 slpm. For example, the flow rate of the first fuel in the first gas 76 may be about 1.0 slpm, or about 1.25 slpm, or about 1.5 slpm, or about 1.75 slpm, or about 2.0 slpm, or about 2.25 slpm, or about 2.5 slpm, or about 2.75 slpm, or about 3.0 slpm, or about 3.25 slpm, or about 3.5 slpm, or about 3.75 slpm, or about 4.0 slpm, or about 4.25 slpm, or about 4.5 slpm, or about 4.75 slpm, or about 5.0 slpm, or about 5.25 slpm, or about 5.5 slpm, or about 5.75 slpm, or about 6.0 slpm, or about 6.25 slpm, or about 6.5 slpm, or about 6.75 slpm, or about 7.0 slpm, or about 7.25 slpm, or about 7.5 slpm, or about 7.75 slpm, or about 8.0 slpm, or about 8.25 slpm, or about 8.5 slpm, or about 8.75 slpm, or about 9.0 slpm or any and all values and ranges therebetween.

The flow rate of the first oxidizer of the first gas 76 may be from about 1 slpm to about 9 slpm, or from about 1.25 slpm to about 8.75 slpm, or from about 1.5 slpm to about 8.5 slpm, or from about 1.75 slpm to about 8.25 slpm, or from about 2.0 slpm to about 8.0 slpm, or from about 2.25 slpm to about 7.75 slpm, or from about 2.5 slpm to about 7.5 slpm, or from about 2.75 slpm to about 7.25 slpm, or from about 3.0 slpm to about 7.0 slpm, or from about 3.25 slpm to about 7.75 slpm, or from about 3.5 slpm to about 7.5 slpm, or from about 3.75 slpm to about 7.25 slpm, or from about 4.0 slpm to about 7.0 slpm, or from about 4.25 slpm to about 6.75 slpm, or from about 4.5 slpm to about 6.5 slpm, or from about 4.75 slpm to about 6.25 slpm, or from about 5.0 slpm to about 6.0 slpm. For example, the flow rate of the first oxidizer in the first gas 76 may be about 1.0 slpm, or about 1.25 slpm, or about 1.5 slpm, or about 1.75 slpm, or about 2.0 slpm, or about 2.25 slpm, or about 2.5 slpm, or about 2.75 slpm, or about 3.0 slpm, or about 3.25 slpm, or about 3.5 slpm, or about 3.75 slpm, or about 4.0 slpm, or about 4.25 slpm, or about 4.5 slpm, or about 4.75 slpm, or about 5.0 slpm, or about 5.25 slpm, or about 5.5 slpm, or about 5.75 slpm, or about 6.0 slpm, or about 6.25 slpm, or about 6.5 slpm, or about 6.75 slpm, or about 7.0 slpm, or about 7.25 slpm, or about 7.5 slpm, or about 7.75 slpm, or about 8.0 slpm, or about 8.25 slpm, or about 8.5 slpm, or about 8.75 slpm, or about 9.0 slpm or any and all values and ranges therebetween.

According to various examples, the first gas 76 may be fuel rich or have a higher molar ratio of first fuel stream than the first oxidizer. The mol % of the first fuel stream in the first gas 76 may be from about 50 mol % to about 70 mol %, or from about 50 mol % to about 68 mol %, or from about 50 mol % to about 66 mol %, or from about 50 mol % to about 64 mol %, or from about 50 mol % to about 62 mol %, or from about 50 mol % to about 60 mol %, or from about 50 mol % to about 58 mol %, or from about 50 mol % to about 56 mol %, or from about 50 mol % to about 54 mol %, or from about 50 mol % to about 52 mol % or any and all values and ranges therebetween. It will be understood that the molar ratio of fuel to oxidizer may also be expressed as an equivalence ratio $\phi$. The equivalence ratio is defined as the ratio of the actual fuel/oxidizer ratio to the stoichiometric fuel/oxidizer ratio. Stoichiometric combustion occurs when all the oxidizer is consumed in the reaction, and there is no oxidizer (e.g., molecular oxygen) in the products of the combustion. As such, an equivalence ratio of greater than 1 indicates excess fuel, while an equivalence ratio less than 1 indicates excess oxidizer. A first equivalence ratio of the first fuel stream to the first oxidizer in the first gas 76 may be about 1.0 or greater, or about 1.3 or greater, or about 1.6 or greater, or about 2.0 or greater, or about 3.0 or greater, or about 4.0 or greater, or about 5.0 or greater, or about 10 or greater, or about 50 or greater, or about 100 or greater, or about 1000 or greater, or about infinity, or in the range from about 1.0 to about 100, or in the range from about 1.2 to about 50, or in the range from about 1.3 to about 25, or in the range from about 1.4 to about 15, or in the range from about 1.5 to about 10, or in the range from about 1.6 to about 8, or any and all values and ranges therebetween. Infinity occurs when no oxidizer flow is used. For example, the first equivalence ratio may be from about 1 to about infinity, or from about 1.6 to about infinity, or from about 2 to about infinity, etc.

As a result of the first fuel stream to first oxidizer equivalence ratio in the first gas 76, the first gas 76 may exhibit a first burning velocity. For purposes of this disclosure, the term "burning velocity" is the speed at which a laminar combustion wave propagates relative to an unburned gas mixture (e.g., the first or second gases 76, 94) ahead of it. The first burning velocity of the combusted first fuel stream and first oxidizer of the first gas 76 may be about 5 cm/s, or about 10 cm/s, or about 15 cm/s, or about 20 cm/s, or about 25 cm/s, or about 30 cm/s, or about 35 cm/s, or about 40 cm/s, or about 45 cm/s, or about 50 cm/s, or about 55 cm/s, or about 60 cm/s, or about 65 cm/s, or about 70 cm/s, or about 75 cm/s, or about 80 cm/s, or about 80 cm/s or any and all values and ranges between these values. For example, the first burning velocity of the second gas 94 may be from about 10 cm/s to about 75 cm/s, or from about 20 cm/s to about 50 cm/s, or from about 30 cm/s to about 50 cm/s.

A step 118 of combusting the second fuel stream and the second oxidizer of the second gas 94 at the burner face 22 is performed. According to various examples, the second gas 94 has a second equivalence ratio of the second fuel stream and the second oxidizer which is less than about 1. Step 118 is accomplished by passing the second gas 94 including the second oxidizer and the second fuel stream through the secondary tubes 96 of the burner 10 and then igniting the second gas 94. As explained above, the second fuel stream and the second oxidizer may be premixed in advance of the burner face 22 (i.e., prior to entering the burner 10 and/or within the burner 10). Combustion of the second gas 94 forms a secondary flame 98 at an inner radial position (i.e. inside the periphery and between outer flame 78 and fume tube aperture 84). Conventional burner designs may use additional oxygen to aid in combustion of excess fuels and silicon laden compounds. Use of the present disclosure, which utilizes both the second fuel stream in the second gas 94 and a sufficient amount of the second oxidizer to combust the second fuel stream, imparts a variety of beneficial flame characteristics as explained in greater detail below. Given the placement of the second tubes 96, the second gas 94 is passed between the first gas 76 and the fume gas 80. As explained above, the second oxygen and second fuel may be mixed to form the second gas 94 prior to entry into the burner 10, in the burner 10 or at the burner face 22.

Flow rates and molar ratios of the second fuel and second oxidizer of the second gas 94 depend on the compositions of the second fuel and second oxidizer. Representative flow rates based on using methane as the second fuel and oxygen as the second oxidizer follow. One skilled in the art can determine similarly appropriate flow rates and molar ratios for other combinations of fuels and oxidizers.

The second oxidizer of the second gas 94 may be passed through the burner at a flow rate of from about 12 slpm to about 36 slpm, or from about 13 slpm to about 35 slpm, or from about 14 slpm to about 34 slpm, or from about 15 slpm to about 33 slpm, or from about 16 slpm to about 32 slpm, or from about 17 slpm to about 31 slpm, or from about 18 slpm to about 30 slpm, or from about 19 slpm to about 29 slpm, or from about 20 slpm to about 28 slpm, or from about 21 slpm to about 27 slpm, or from about 22 slpm to about 26 slpm, or from about 23 slpm to about 25 slpm. For example, the second oxidizer of the second gas 94 can be passed at a rate of about 12 slpm, or about 13 slpm, or about 14 slpm, or about 15 slpm, or about 16 slpm, or about 17 slpm, or about 18 slpm, or about 19 slpm, or about 20 slpm, or about 21 slpm, or about 22 slpm, or about 23 slpm, or about 24 slpm, or about 25 slpm, or about 26 slpm, or about 27 slpm, or about 28 slpm, or about 29 slpm, or about 30 slpm, or about 31 slpm, or about 32 slpm, or about 33 slpm, or about 34 slpm or any and all values and ranges therebetween.

The second fuel stream of the second gas 94 may be passed at a rate of from about 1 standard liters per minute (slpm) to about 9 slpm, or from about 1.25 slpm to about 8.75 slpm, or from about 1.5 slpm to about 8.5 slpm, or from about 1.75 slpm to about 8.25 slpm, or from about 2.0 slpm to about 8.0 slpm, or from about 2.25 slpm to about 7.75 slpm, or from about 2.5 slpm to about 7.5 slpm, or from about 2.75 slpm to about 7.25 slpm, or from about 3.0 slpm to about 7.0 slpm, or from about 3.25 slpm to about 7.75 slpm, or from about 3.5 slpm to about 7.5 slpm, or from about 3.75 slpm to about 7.25 slpm, or from about 4.0 slpm to about 7.0 slpm, or from about 4.25 slpm to about 6.75 slpm, or from about 4.5 slpm to about 6.5 slpm, or from about 4.75 slpm to about 6.25 slpm, or from about 5.0 slpm to about 6.0 slpm. For example, the flow rate of the second fuel stream in the second gas 94 may be about 1.0 slpm, or about 1.25 slpm, or about 1.5 slpm, or about 1.75 slpm, or about 2.0 slpm, or about 2.25 slpm, or about 2.5 slpm, or about 2.75 slpm, or about 3.0 slpm, or about 3.25 slpm, or about 3.5 slpm, or about 3.75 slpm, or about 4.0 slpm, or about 4.25 slpm, or about 4.5 slpm, or about 4.75 slpm, or about 5.0 slpm, or about 5.25 slpm, or about 5.5 slpm, or about 5.75 slpm, or about 6.0 slpm, or about 6.25 slpm, or about 6.5 slpm, or about 6.75 slpm, or about 7.0 slpm, or about 7.25 slpm, or about 7.5 slpm, or about 7.75 slpm, or about 8.0 slpm, or about 8.25 slpm, or about 8.5 slpm, or about 8.75 slpm, or about 9.0 slpm or any and all values and ranges therebetween.

The molar ratio of the second fuel stream and the second oxidizer in the second gas 94 may be such that the second gas 94 has a greater mol % of the second oxidizer than second fuel stream. In other words, the second gas 94 may be said to be lean. The mol % of the second fuel stream in the second gas 94 may be from about 1 mol % to about 49 mol %, or from about 1 mol % to about 40 mol %, or from about 1 mol % to about 33 mol %, or from about 1 mol % to about 30 mol %, or from about 2 mol % to about 25 mol %, or from about 4 mol % to about 24 mol %, or from about 6 mol % to about 23 mol %, or from about 8 mol % to about 21 mol %, or from about 10 mol % to about 20 mol %, or from about 11 mol % to about 19 mol %, or from about 12 mol % to about 18 mol %, or from about 13 mol % to about 17 mol %, or from about 14 mol % to about 16 mol % or from about 15 mol % to about 16 mol %. For example, the mol % of the second fuel stream in the second gas 94 may be about 1 mol %, or about 2 mol %, or about 3 mol %, or about 4 mol %, or about 5 mol %, or about 6 mol %, or about 7 mol %, or about 8 mol %, or about 9 mol %, or about 10 mol %, or about 11 mol %, or about 12 mol %, or about 13 mol %, or about 14 mol %, or about 15 mol %, or about 16 mol %, or about 17 mol %, or about 18 mol %, or about 19 mol %, or about 20 mol %, or about 21 mol %, or about 22 mol %, or about 23 mol %, or about 24 mol %, or about 25 mol % or any and all values and ranges therebetween. A second equivalence ratio of the second fuel stream to the second oxidizer in the second gas 94 may be about 0.1, or about 0.2, or about 0.3, or about 0.33, or about 0.4, or about 0.5, or about 0.6, or about 0.7, or about 0.8, or about 0.9, or about 1.0 or any and all values between these values. For example, the second equivalence ratio would be less than 1, or from about 0.1 to about 0.9, or from about 0.1 to about 0.8, or from about 0.1 to about 0.7, or from about 0.1 to about 0.6, or from about 0.1 to about 0.5, or from about 0.2 to about 0.4.

As a result of the second equivalence ratio between the second fuel stream to second oxidizer in the second gas 94, the second gas 94 may exhibit a second burning velocity. The second burning velocity of the combusted second fuel stream and second oxidizer of the second gas 94 may be about 25 cm/s, or about 50 cm/s, or about 75 cm/s, or about 100 cm/s, or about 125 cm/s, or about 150 cm/s, or about 175 cm/s, or about 200 cm/s, or about 225 cm/s or about 250 cm/s or any and all values and ranges between these values. For example, the second burning velocity of the second gas 94 may be from about 50 cm/s to about 225 cm/s, or from about 100 cm/s to about 175 cm/s, or from about 125 cm/s to about 150 cm/s.

A step 122 of combusting the silicon-containing fuel into the plurality of silica soot particles 12 is completed. Step 122 may be accomplished by passing or directing the fume gas 80 including at least one of $O_2$ and $N_2$ and the silicon-containing fuel through the fume tube 52 of the burner 10. As such, step 122 includes passing the silicon-containing fuel through the fume tube aperture 84. The fume gas 80 may be passed at such a rate that the $O_2$ and/or the $N_2$ have a flow rate through the fume tube 52 of from about 6 standard liters per minute (slpm) to about 9 slpm, or from about 6.25 slpm to about 8.75 slpm, or from about 6.5 slpm to about 8.5 slpm, or from about 6.75 slpm to about 8.25 slpm, or from about 7.0 slpm to about 8.0 slpm, or from about 7.25 slpm to about 7.75 slpm. For example, the flow rate of $O_2$ and/or $N_2$ passed through the fume tube 52 in the fume gas 80 may be about 6.25 slpm, or about 6.5 slpm, or about 6.75 slpm, or about 7.0 slpm, or about 7.25 slpm, or about 7.5 slpm, or about 7.75 slpm, or about 8.0 slpm, or about 8.25 slpm, or about 8.5 slpm, or about 8.75 slpm, or about 9.0 slpm or any and all values and ranges therebetween.

As explained above, the silicon-containing fuel may include octamethylcyclotetra-siloxane, decamethylcyclopentasiloxane, dodecamethylcyclohexasiloxane, hexamethyl-cyclotrisiloxane, hexamethyldisiloxane, octamethyltrisiloxane, decamethyltetrasiloxane, dodecamethylpentasiloxane, other silicon-containing fuels and/or combinations thereof. The silicon-containing fuel may be passed in the fume gas 80 at a rate of from about 12 grams per minute (gpm) to about 36 gpm, or from about 13 gpm to about 35 gpm, or from about 14 gpm to about 34 gpm, or from about 15 gpm to about 33 gpm, or from about 16 gpm to about 32 gpm, or from about 17 gpm to about 31 gpm, or from about 18 gpm to about 30 gpm, or from about 19 gpm to about 29 gpm, or from about 20 gpm to about 28 gpm, or from about 21 gpm to about 27 gpm, or from about 22 gpm to about 26 gpm, or from about 23 gpm to about 25 gpm. For example, the silicon-containing fuel can be passed through the fume tube 52 at a rate of about 12 gpm, or about 13 gpm, or about 14 gpm, or about 15 gpm, or about 16 gpm, or about 17 gpm, or about 18 gpm, or about 19 gpm, or about 20 gpm, or about 21 gpm, or about 22 gpm, or about 23 gpm, or about 24 gpm, or about 25 gpm, or about 26 gpm, or about 27 gpm, or about 28 gpm, or about 29 gpm, or about 30 gpm, or about 31 gpm, or about 32 gpm, or about 33 gpm, or about 34 gpm or any and all values and ranges therebetween.

The silicon-containing fuel is combusted under a silicon equivalence ratio to produce the plurality of silica soot particles 12. The silicon equivalence ratio may be about 1, or about 1.2, or about 1.4, or about 1.6, or about 1.8, or about 2.0, or about 2.2, or about 2.4, or about 2.6, or about 2.67, or about 2.8, or about 3.0, or about 3.2, or about 3.4, or about 3.6, or about 3.8, or about 4.0, or about 4.2, or about 4.4, or about 4.6, or about 4.8, or about 5.0 or any and all values and ranges therebetween. For example, the silicon equivalence ratio may be from about 1 to about 5, or from about 2 to about 4, or from about 2.67 to about 4, or from about 2.5 to about 3.5, or from about 3 to about 4. It will be understood that the oxidizing agent which is used to combust the silicon-containing fuel may be provided by the fume gas 80, the ambient environment and/or the second oxidizer. For example, after combustion of the second fuel stream, excess second oxidizer (i.e., as the second equivalence ratio is less than 1) may be utilized to combust the silicon-containing fuel in addition to oxidizers present in the fume gas 80 to reach the silicon equivalence ratio.

Combustion of the silicon-containing fuel (i.e., the fume gas 80) into the plurality of silica soot particles 12 occurs at the lift-off distance 18 away from the burner face 22. As explained above, the combustion of the silicon-containing fuel occurs by igniting the silicon-containing fuel and/or fume gas 80 at the lift-off distance 18 from the burner face 22 of the burner 10. As used herein, the lift-off distance 18 is the shortest distance between an ignition point 132 on a stable flame front of the silicon-containing fuel the burner face 22 as measured in a direction perpendicular to the burner face 22 (see inset 40). The stable flame front may have one or more ignition points 132 where the flame begins. The ignition points 132 are typically visible as the silica soot particles 12 formed by the ignition radiate light due to the elevated temperature of the combustion. As such, the lift-off distance 18 is measured by imaging the burner face 22 and measuring the distance between the closest ignition point 132 (i.e., the closest visible light generation) and the burner face 22.

As will be explained in greater detail below, conventional silica soot-producing assemblies may strive to lengthen the distance at which point silicon-including compounds are ignited as this may lead to lower combustion temperatures which prolong assembly life. Further, conventional systems which have attempted to shorten the ignition distance often result in a more dispersed and unsteady soot production which lowers soot capture rate and efficiency while also creating a buildup of residue on the soot-producing assembly. Contrarily, use of the present disclosure allows for a relatively shorter lift-off distance 18, which may allow a more concentrated and less dispersed silica soot stream 16 to be formed and aimed at the substrate 14.

The lift-off distance 18 may be about 0.05 cm, or about 0.1 cm, or about 0.15 cm, or about 0.2 cm, or about 0.25 cm, or about 0.3 cm, or about 0.35 cm, or about 0.4 cm, or about 0.45 cm, or about 0.5 cm, or about 0.55 cm, or about 0.6 cm, or about 0.65 cm, or about 0.7 cm, or about 0.75 cm, or about 0.8 cm, or about 0.85 cm, or about 0.9 cm, or about 0.95 cm or any and all values and ranges therebetween. For example, the lift-off distance 18 may be from about 0.05 cm to about 0.95 cm, or from about 0.1 cm to about 0.95 cm, or from about 0.1 cm to about 0.9 cm, or from about 0.1 cm to about 0.8 cm, or from about 0.1 cm to about 0.6 cm, or from about 0.2 cm to about 0.7 cm, or from about 0.3 cm to about 0.7 cm, or from about 0.3 cm to about 0.6 cm, or from about 0.4 cm to about 0.6 cm.

The burner 10 may exhibit a lift-off ratio which is the lift-off distance 18 divided by a longest cross-sectional linear dimension of the fume tube aperture 84 at burner face 22. The lift-off ratio may be about 0.1, or about 0.2, or about 0.3, to about 0.33, or about 0.4, or about 0.5, or about 0.6, or about 0.7, or about 0.8, or about 0.9, or about 1, or about 1.5 or about 2.0, or about 2.5, or about 3, or about 3.5, or about 4, or about 4.5, or about 5, or about 5.5, or about 6, or about 6.5, or about 7, or about 7.5, or about 8 or any and all values and ranges therebetween. For example, the lift-off ratio may be from about 0.1 to about 8, or from about 0.33 to about 8, or from about 1 to about 8, or from about 1 to about 7, or from about 1 to about 6, or from about 1 to about 5, or from about 1 to about 4, or from about 1 to about 3, or from about 2 to about 3, or from about 2 to about 2.5.

In operation, the second fuel stream combusts with a portion of the second oxidizer and heats the remaining second oxidizer from the second gas 94. This places a very hot stream of the second oxidizer near the silicon-containing fuel of the fume gas 80 which more vigorously interacts with the silicon-containing fuel and starts the combustion to the silica soot particles 12 closer to the burner face 22 (i.e., reduces the lift-off distance 18) as compared to conventional designs (e.g. designs lacking the second gas configured as described herein).

As the silicon-containing fuel is ignited, it reacts with the second oxidizer of the second gas 94 and/or the oxidizing agent of the fume gas 80 to form the plurality of silica soot particles 12. The silica soot particles 12 travel from the ignition point 132 at the lift-off distance 18 in the soot stream 16 toward the substrate 14. Use of the present disclosure (e.g., tailoring of the lift-off distance 18 through use of the second gas 94) may produce a soot stream 16 having a low dispersion of the silica soot particles 12. For example, a relatively large mass percentage of the silica soot particles 12 produced by the burner 10 may pass through an "effective zone" of the soot stream 16. The effective zone of the soot stream 16 is used for determining the dispersion of the silica soot particles 12 and is defined at 2 cm from the surface of the substrate 14, has a radius of 0.6 cm (i.e., defines a circular shape) and is substantially coaxial with the fume tube 52. The mass percentage of the silica soot particles 12 passing through the effective zone may be a measure of the efficiency of the burner 10 as a more concentrated soot stream 16 may have a greater amount of the silica soot particles 12 contact the substrate 14. The mass percentage of the silica soot particles 12 is measured by computer modeling the setup of the burner 10 and determining the mass of simulated soot particles 12 passing through the defined effective zone divided by the total mass of silica particles 12 and multiplied by 100. A mass percentage of silica soot particles 12 passing through the effective zone may be from about 30% to about 90%, or from about 40% to about 85%, or from about 50% to about 80%, or from about 60% to about 75%. For example, the mass percentage of silica soot particles 12 passing through the effective zone may be about 30%, or about 35%, or about 40%, or about 45%, or about 50%, or about 55%, or about 60%, or about 65%, or about 70%, or about 75%, or about 80%, or about 85%, or about 90% or any and all values and ranges therebetween. A higher mass percentage of the silica soot particles 12 passing through the effective zone generally indicates lower dispersion of the silica soot particles 12, which may generally increase the capture efficiency of the silica soot particles 12 on the substrate 14.

The soot stream 16 may have a relatively high mass fraction of silica soot particles 12 as measured at the effective zone. The mass fraction of silica soot particles 12 is the weight of the silica soot particles 12 within a given volume (i.e., the effective area with a given thickness such as about 1 mm) divided by the total weight of all matter within the same volume once the burner 10 has reached steady state operation. It will be understood that balance of matter at the effective zone may be hot gases or other combustion products. The mass fraction of the silica soot particles 12 as measured at the effective zone may be from about 0.1 to about 0.6 or from about 0.2 to about 0.4. For example, the mass fraction of silica soot particles 12 may be about 0.1, or about 0.12, or about 0.14, or about 0.16, or about 0.18, or about 0.2, or about 0.22, or about 0.24, or about 0.26, or about 0.28, or about 0.3, or about 0.32, or about 0.34, or about 0.36, or about 0.38, or about 0.4, or about 0.42, or about 0.44, or about 0.46, or about 0.48, or about 0.5 or any and all values and ranges therebetween. It will be understood that the mass fraction of the soot stream 16 will decrease with increasing radial distance from a centerline axis of the soot stream 16.

A step 126 of directing the shield gas 86 between the silicon-containing fuel and the combustion of the second fuel stream and the second oxidizer may be performed. As explained above, the shield gas 86 may include $N_2$, Kr, Ar, other inert gas, non-silicon-containing fuel and/or combinations thereof. The shield gas 86 is passed through the burner 10 such that it exits the burner face 22 through the shield gas aperture 88 between the fume gas 80 and the second gas 94. The shield gas 86 may be passed around the fume gas 80 at a rate of from about 1 slpm to about 5 slpm, or from about 1.5 slpm to about 4.5 slpm. For example, the shield gas 86 may be passed at a rate of about 1 slpm, or about 1.5 slpm, or about 2.0 slpm, or about 2.5 slpm, or about 3.0 slpm, or about 3.5 slpm, or about 4.0 slpm, or about 4.5 slpm, or about 5.0 slpm or any and all values and ranges therebetween.

Formation of the silica soot particles 12 and their subsequent movement away from the burner face 22 of the burner 10 may be utilized in a subsequent step of depositing a portion of the plurality of silica soot particles 12 on the substrate 14. As explained above, the substrate 14 may be any component used in the manufacturing of an optical fiber preform or other silicon-containing article.

In further embodiments, gases in addition to first gas 76, fume gas 80, shield gas 86, and second gas 94 are provided to burner 10 and delivered through burner face 22. Referring to FIGS. 1A and 1B, for example, one skilled in the art would realize it is also possible to physically modify the burner 10 and burner face 22 such that one or more additional gas flow streams could be flowed through additional tubes added between the flow of second gas 94 through secondary tubes 96, and the silicon-containing fuel passing through fume tube aperture 84. The additional gas flow stream so arranged on the modified burner 10, and exiting the modified burner face 22, could be either an additional (e.g. third or fourth) fuel (that lacks silicon), or an additional (e.g. third or fourth) fuel (that lacks silicon) that is pre-mixed with an additional (e.g. third) oxidizer. It should be clear from this concept that the potential gas species, their flow rates, and their molar ratios for the additional gas flow streams would be essentially similar to the second gas described herein.

It will be understood that as the burner 10 is enlarged or shrunk (i.e., due to production requirements), the volume and/or mass flow rates of the above-noted components used in the method 110 may correspondingly increase or decrease without departing from the teachings provided herein. Further, the above-noted steps may be performed in any order and/or substantially simultaneously without departing from the teachings provided herein.

Use of the present disclosure may offer a variety of advantages. First, the use of the present disclosure may decrease an audible sound produced by the burner 10 while in operation. Conventional burner systems may produce sound having a noise level of about 100 dB or greater as measured at about 1 meter. Use of the present disclosure may allow the burner 10 to produce sound at a noise level of from about 60 dB to about 90 dB as measured at 1 meter. Those with ordinary skill in the art will recognize for economic reasons a plurality of burners is often used for manufacture of an optical fiber preform. Further, to enable additional efficiencies, those with ordinary skill in the art recognize it is common to co-locate several optical fiber preform machines in a manufacturing area. Accordingly, the noise from combustion from a plurality of burners and a plurality of machines scales according to the logarithmic behavior of the decibel scale. Even though the combustion process is contained within a soot deposition chamber, the audible noise from a plurality of burners and a plurality of machines can approach or exceed safety standards depending on jurisdiction and applicable law, typically requiring personal protective equipment or similar mitigations depending on regulations. It is therefore evident the present disclosure can be advantaged for audible noise.

Second, the capture efficiency of the silica soot particles 12 by the substrate 14 may be increased relative to conventional designs. For example, as the mass fraction of the silica soot particles 12 which pass through the effective zone is increased, the dispersion of the silica soot particles 12 decreases. Such a feature is advantageous in allowing a greater amount of silica soot particles 12 to be deposited on the substrate 14 per pass (i.e., fewer soot particles 12 may blow past the substrate 14 and not get deposited). As such, a greater efficiency can be obtained by the burner 10. Further, smaller substrates 14 may be utilized while maintaining acceptable capture efficiency rates.

Third, only minor changes to a conventional burner design may be needed to achieve higher soot capture efficiency. Conventional combustion systems often require new parts or couplings in order to upgrade capabilities. Use of the present disclosure offers a method of providing a different set of gases to the burner 10 in order to effectuate a large change in the operation of the burner 10. Further, as minimal or no hardware changes to the burner 10 may be required, use of the present disclosure may allow for little to no capital or operational cost increase.

EXAMPLES

Provided below are examples consistent with the present disclosure and comparative examples.

Figure 3A:
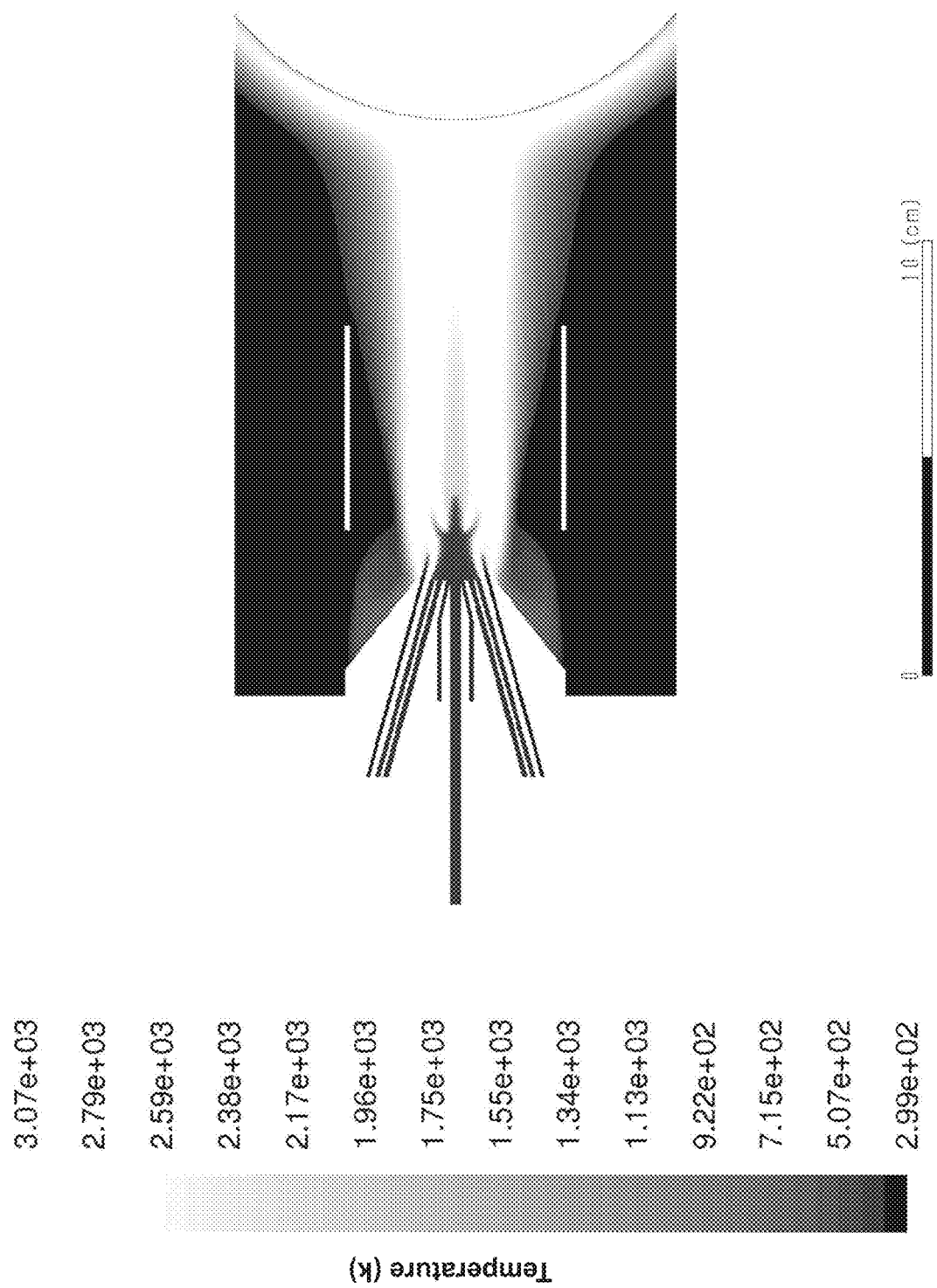
FIG. 3A is a temperature model of a first comparative example.
Figure 3B:
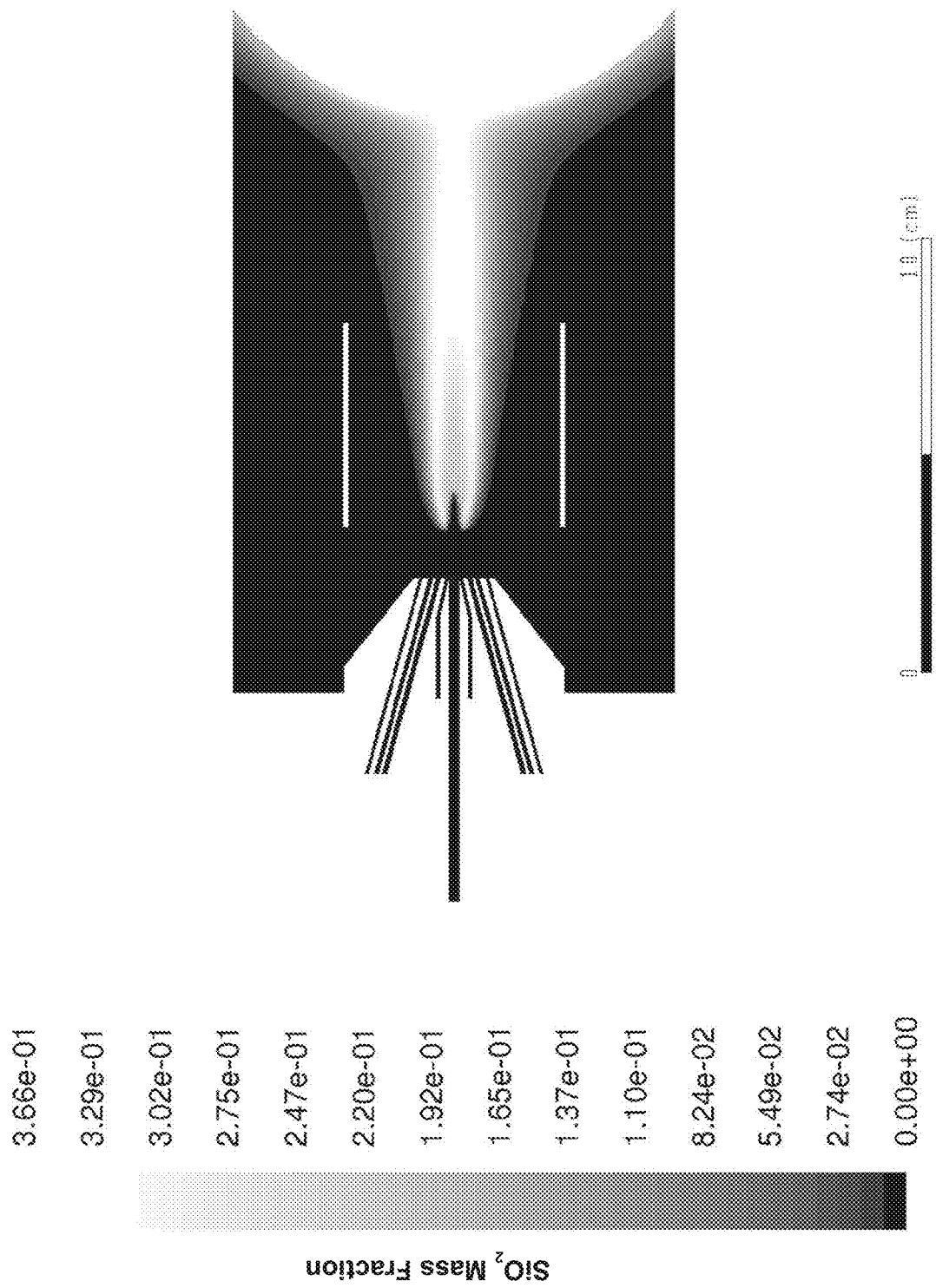
FIG. 3B is an $SiO_2$ mass fraction model of the first comparative example.
Figure 3C:
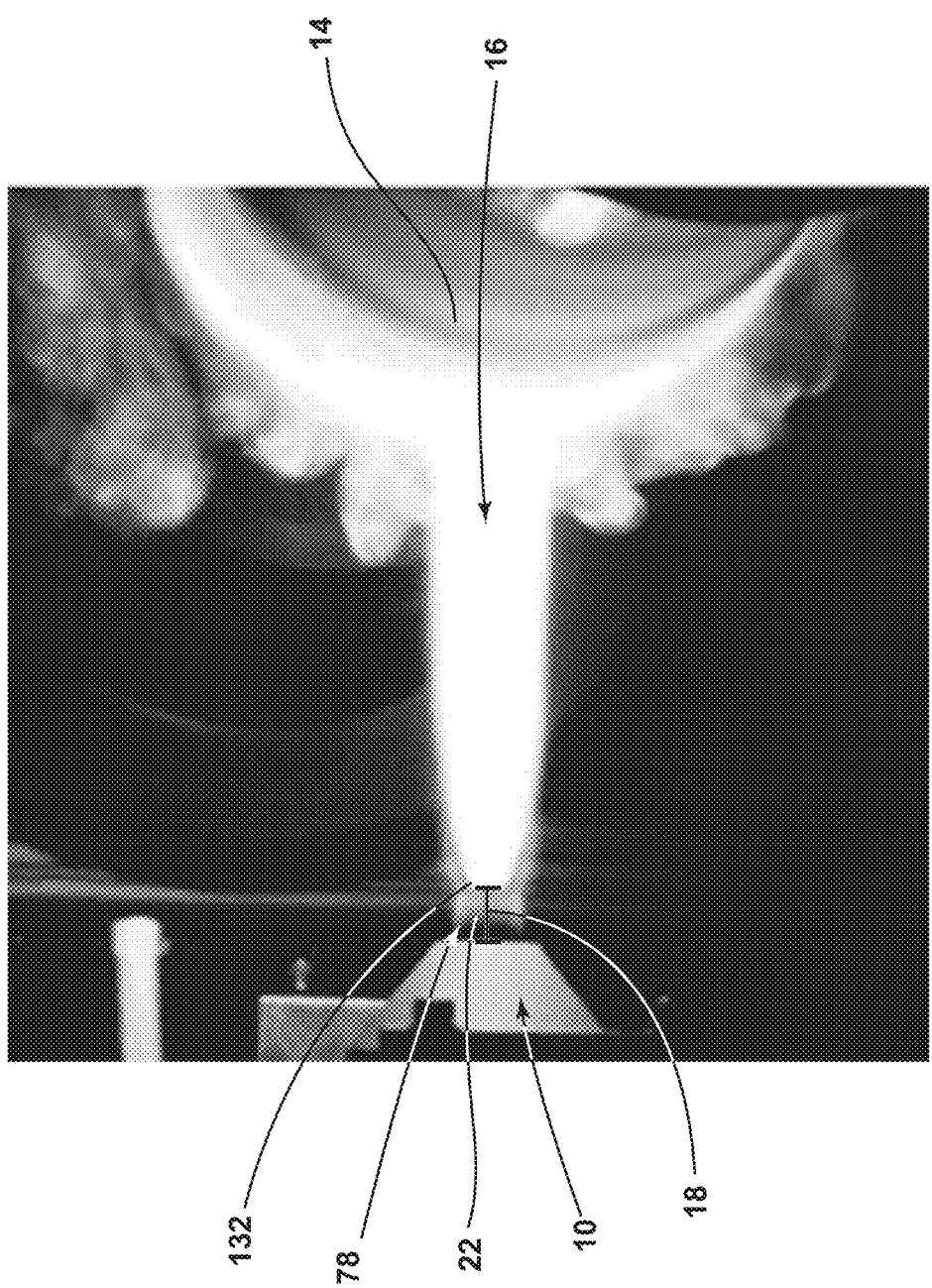
FIG. 3C is an image taken of the first comparative example in operation.

Referring now to FIGS. 3A-3C, depicted is a first comparative example (i.e., Comparative Example 1). In Comparative Example 1, a combustion system (e.g., the burner 10) passed a mixture of gasses which were ignited. The gasses included a combined fume $O_2$ and fume OMCTS (e.g., the fume gas 80 with OMCTS being the silicon-containing fuel), a shield gas $N_2$ lacking a fuel (e.g., the shield gas 86), an additional gas (e.g., only the second oxidizer of the second gas 94), and a premixed stream of $O_2$ and $CH_4$ (e.g., a premixed example of the first gas 76). The flow rate of the gasses through the combustion system are provided in Table 1 below.

TABLE 1

| Fume $O_2$ | Fume OMCTS | Shield $N_2$ | Additional $O_2$ | Premix $O_2$ | Premix $CH_4$ |
|---|---|---|---|---|---|
| 7.25 slpm | 24 gpm | 3.5 slpm | 16 slpm | 3.2 slpm | 4.25 slpm |

As can be seen from FIGS. 3A-3C, the premixed $O_2$ and $CH_4$ are ignited and burn close to a surface (e.g., the burner face 22) of the combustion system. The flames of the burning premixed gases being close to the surface of the combustion system produce heat and ignite the OMCTS. As the heat of the burning premixed $O_2$ and $CH_4$ are spaced away from the OMCTS by the additional gas, the OMCTS forms a lifted OMCTS flame at an extended ignition distance (e.g., the lift-off distance 18). The ignition of the OMCTS takes place a distance of greater than about 1 cm (lift-off distance) from a surface (e.g., the burner face 22) of the combustion system. The ignition of the OMCTS produces a silica soot jet (e.g., the soot stream 16) extending away from the combustion system. As both predicted from the models of FIGS. 3A and 3B, and shown by the image of FIG. 3C, the increased ignition distance leads to a wide and dispersed soot jet (i.e., the soot stream 16) which impacts a target (e.g., the substrate 14). The soot jet can be seen swirling (i.e., shearing of the soot jet) around the target causing a decrease in capture efficiency of particles (e.g., the silica soot particles 12) as the particles float away from the target.

Figure 4A:
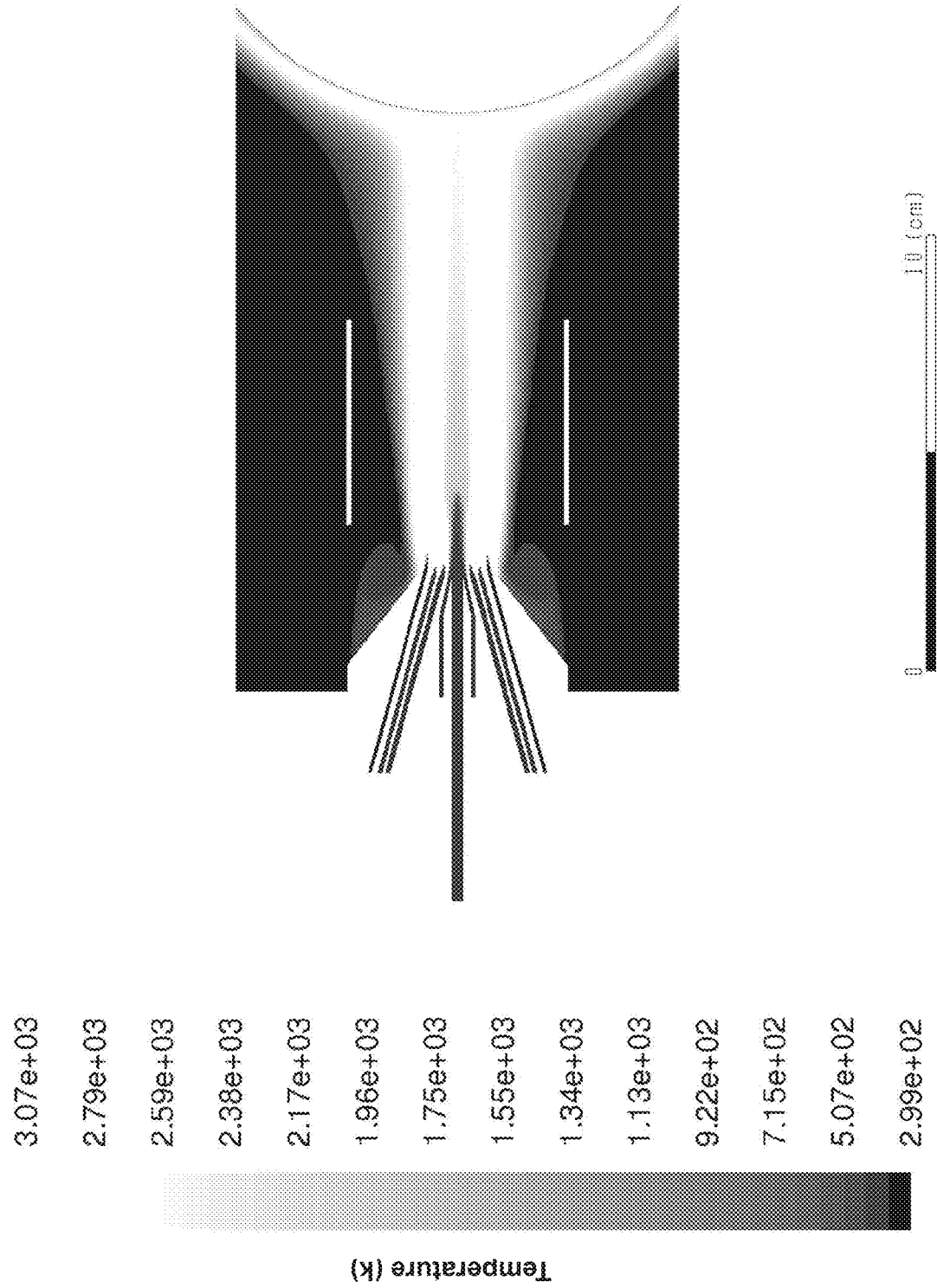
FIG. 4A is a temperature model of a first example consistent with the present disclosure.
Figure 4B:
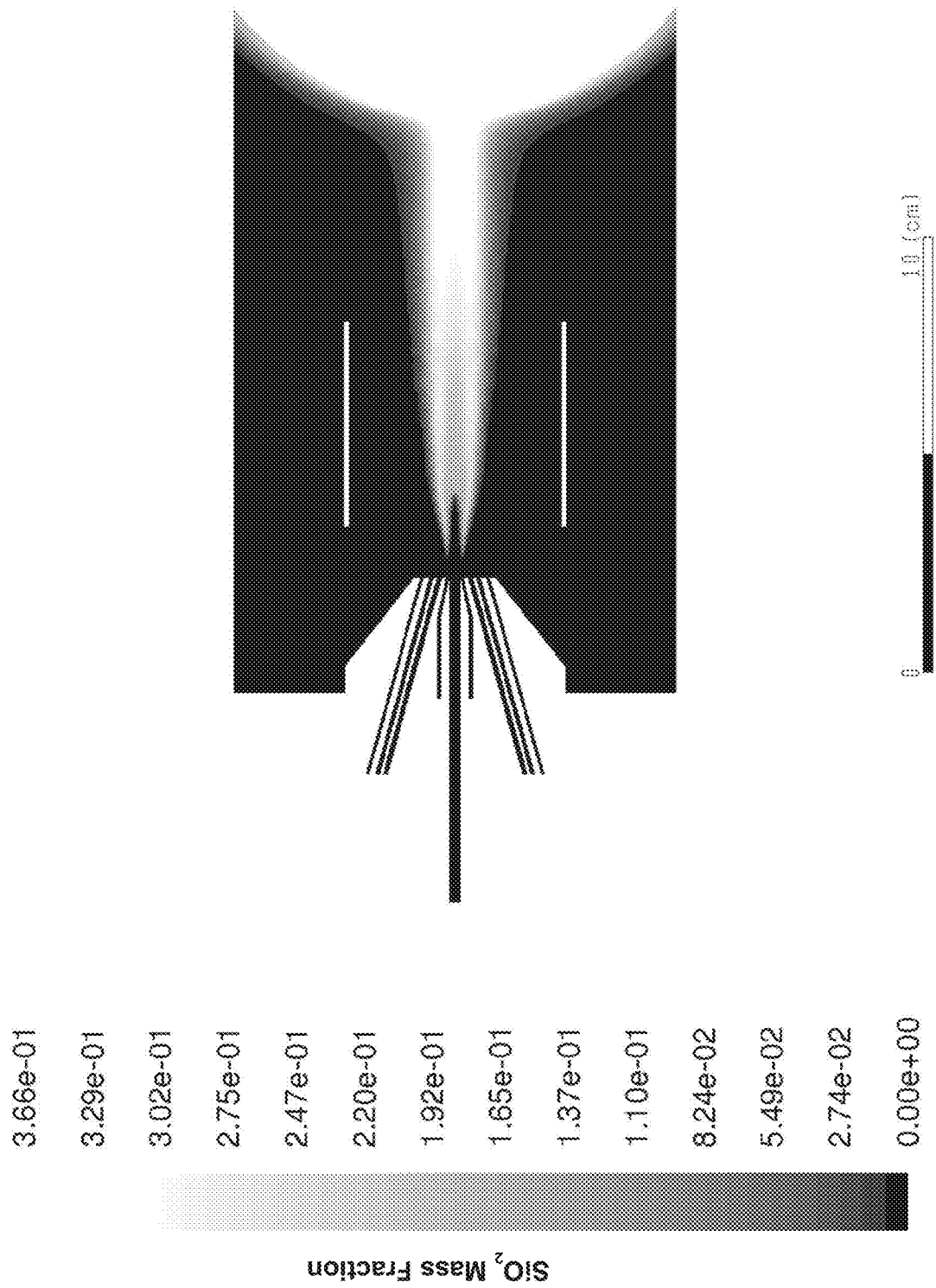
FIG. 4B is an $SiO_2$ mass fraction model of the first example.
Figure 4C:
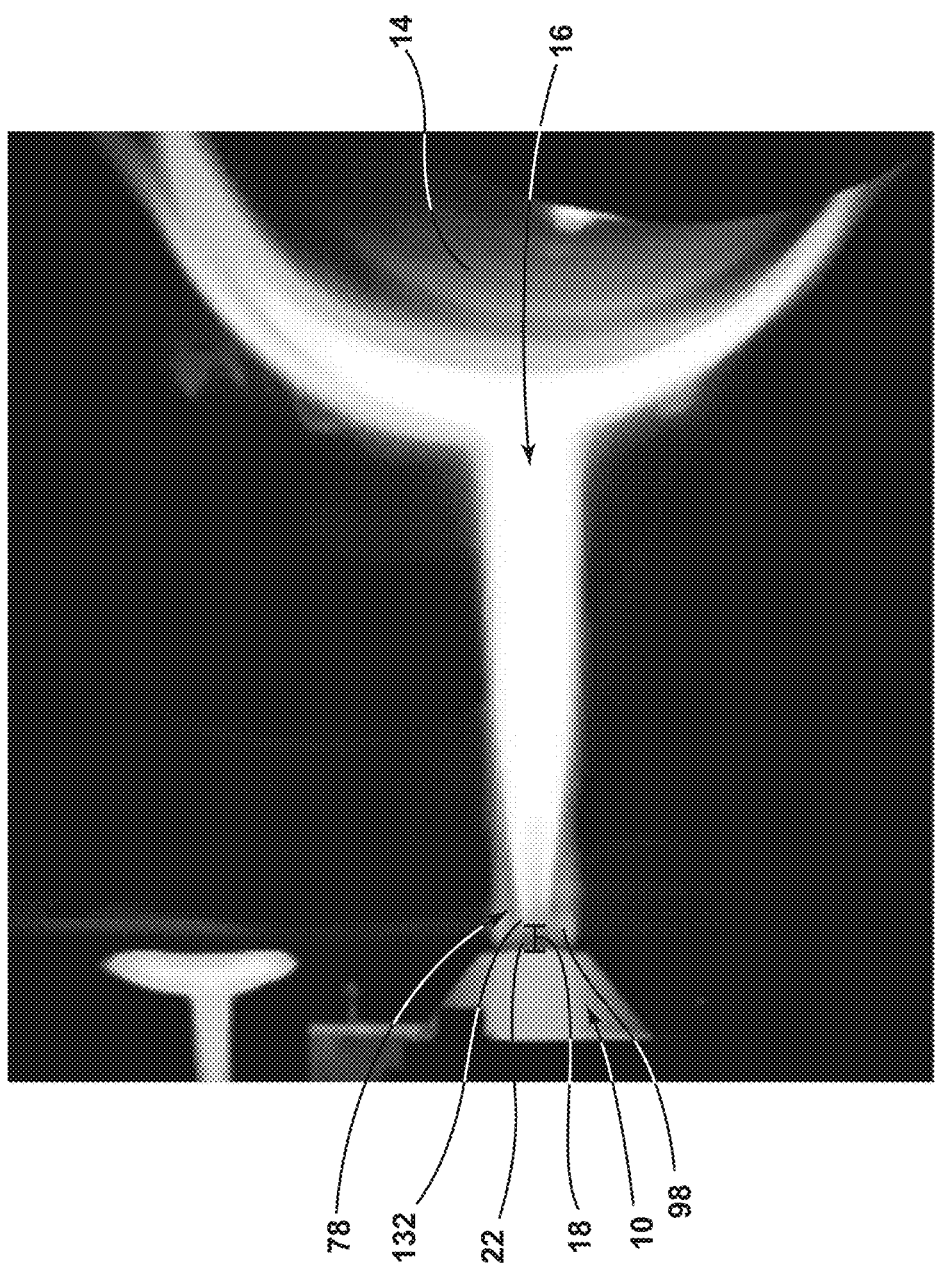
FIG. 4C is an image taken of the first example in operation.

Referring now to FIGS. 4A-4C, depicted is a first example (i.e., Example 1) of the present disclosure. In Example 1, a substantially similar combustion system to that of the Comparative Example 1 passed a mixture of gasses. The gasses included a combined fume $O_2$ and fume OMCTS (e.g., the fume gas 80), a shield gas $N_2$ lacking a fuel (e.g., the shield gas 86), an additional gas (e.g., a premixed example of the second gas 94 including $O_2$ as the second oxidizer and $CH_4$ as the second fuel stream), and a premixed stream of $O_2$ and $CH_4$ (e.g., the first oxidizer and first fuel stream of first gas 76). The flow rate of the gasses through the combustion system are provided in Table 2. The additional gas had an equivalence ratio of less than 1 and the premixed stream of $O_2$ and $CH_4$ had an equivalence ratio of greater than 1.

TABLE 2

| Fume $O_2$ | Fume OMCTS | Shield $N_2$ | Additional $O_2$ | Additional $CH_4$ | Premix $O_2$ | Premix $CH_4$ |
|---|---|---|---|---|---|---|
| 7.25 slpm | 24 gpm | 3.5 slpm | 24 slpm | 4.5 slpm | 3.2 slpm | 4.25 slpm |

As can be seen from FIGS. 4A-4C, the additional $CH_4$ in the additional gas provides an unconventional way of reducing soot jet turbulence by decreasing the distance between the surface and the ignition point of the fume OMCTS. The decrease in the turbulence of the soot jet directly leads to a decrease in soot jet dispersion and in an increase in deposition rate and efficiency. The reduction of turbulence is due to the ignition point of the OMCTS in Example 1 being at about 0.5 cm (lift-off distance) from the surface of the combustion system. Compared with Comparative Example 1, Example 1 had a flow rate for the additional gas which was increased by 75%, of which about 16% was $CH_4$, and 84% was 02.

Figure 5:
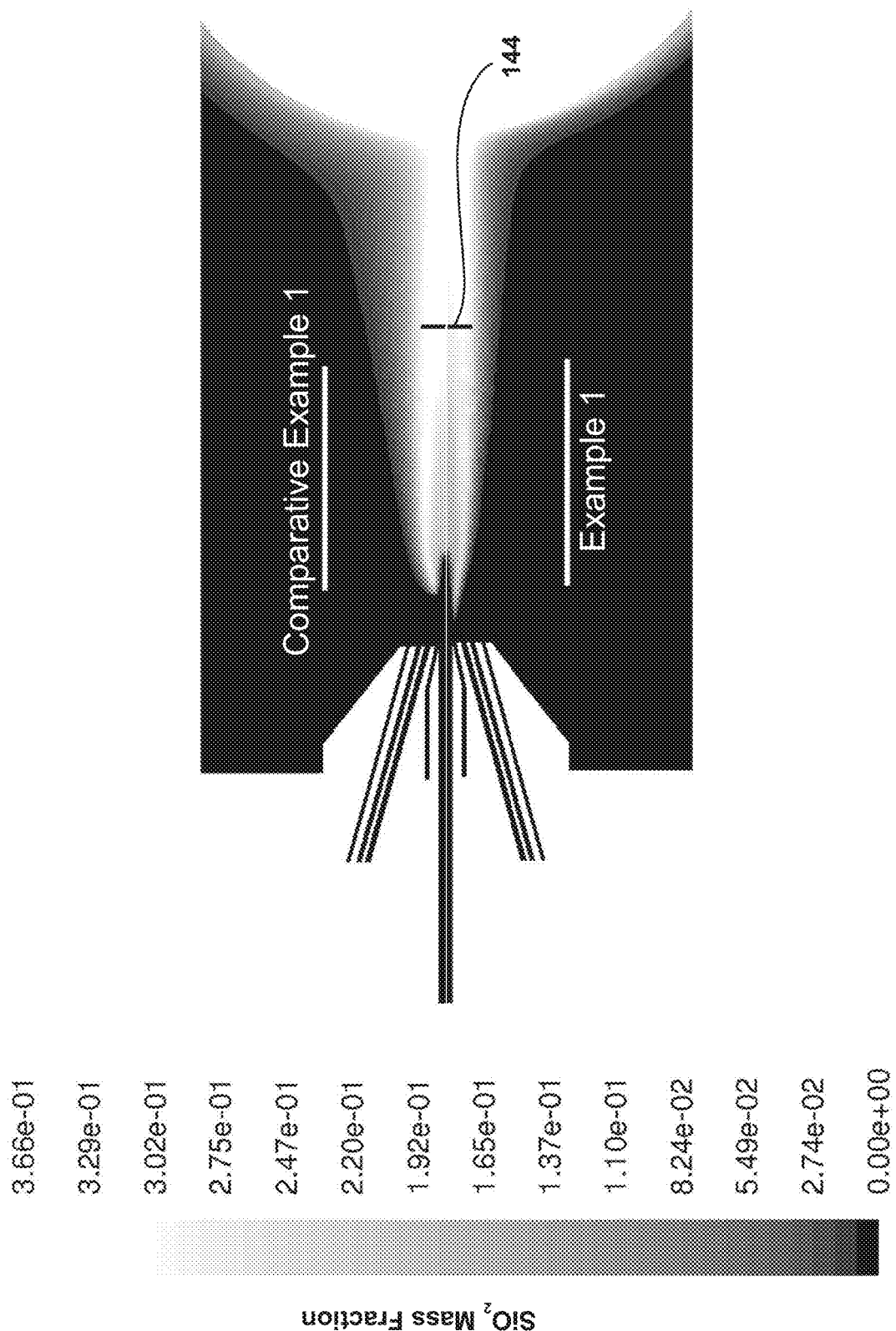
FIG. 5 is a side-by-side comparison of the $SiO_2$ mass fraction model of the first comparative example and the first example.

Referring now to FIG. 5, provided is a side-by-side comparison of the soot jets of Comparative Example 1 and Example 1 with the effective zones 144 superimposed. As can be seen by the comparison of the two soot jets, the soot jet of the Example 1 is less dispersed than the soot jet of Comparative Example 1. As the soot jet of Example 1 is less dispersed than the soot jet of Comparative Example 1, the mass percentage of silica for Example 1 passing through the effective zone 144 is greater than the mass percentage of silica passing through the effective zone 144 for Comparative Example 1. As such, Example 1 is more efficient than Comparative Example 1 in delivering soot to substrate 14. A higher fraction of silica soot in the flame of Comparative Example 1 is directed around substrate 14 without depositing on substrate 14. The fraction of silica soot that bypasses substrate 14 in Comparative Example 1 represents a loss of silica soot that reduces the soot capture efficiency. The fraction of silica soot bypassing substrate 14 in Example 1, in contrast, is low and the soot capture efficiency is much higher. In addition to the mass percentage of Example 1 being greater than Comparative Example 1, the mass flow rate of the soot stream 16 for Example 1 is about 18% greater than for Comparative Example 1.

Figure 6:
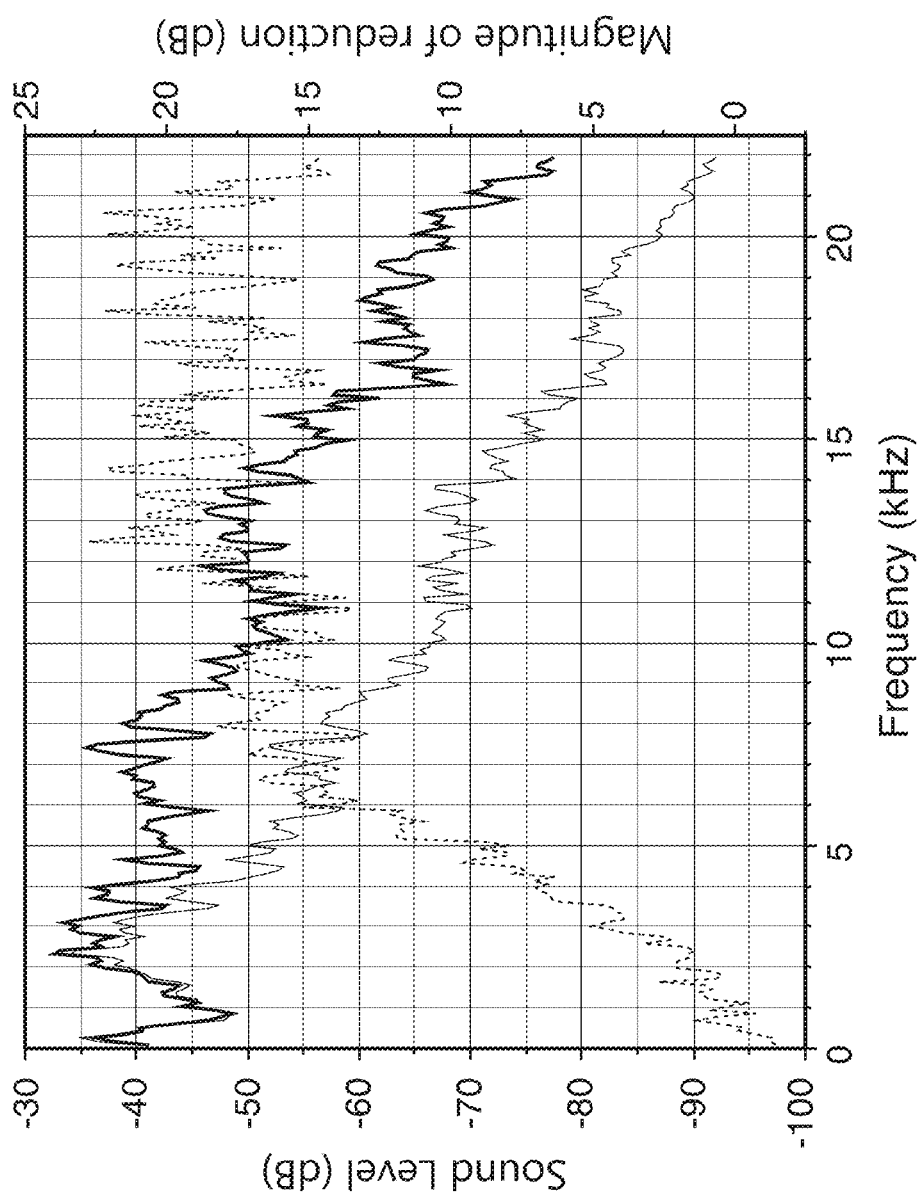
FIG. 6 is a plot of audible noise as a function of frequency.

Referring now to FIG. 6, provided is a plot of experimentally measured sound level as a function of frequency for two discrete conditions previously described herein as examples. Three curves are shown on the plot. The uppermost solid curve, having a generally negative slope, and with typically higher measured sound levels as a function of frequency, arises from the conditions described in Table 1, and in turn modeled in FIGS. 3A-3B producing the representative image in FIG. 3C. The lower solid curve, of similar generally negative slope, and with typically lower measured sound levels as a function of frequency, arises from the conditions described in Table 2, and in turn modeled in FIGS. 4A-4B producing the representative image in FIG. 4C. The lowest curve, represented as a dashed line, is the difference between the two cases noted above, and is plotted as the magnitude of reduction. Via inspection it is seen the magnitude of sound level reduction increases from essentially 0 dB to 13 dB as frequency increases up to approximately 5 kHz, and remains bound between essentially a 13 dB to 23 dB reduction as frequency continues to increase up to 22 kHz.

Figure 7:
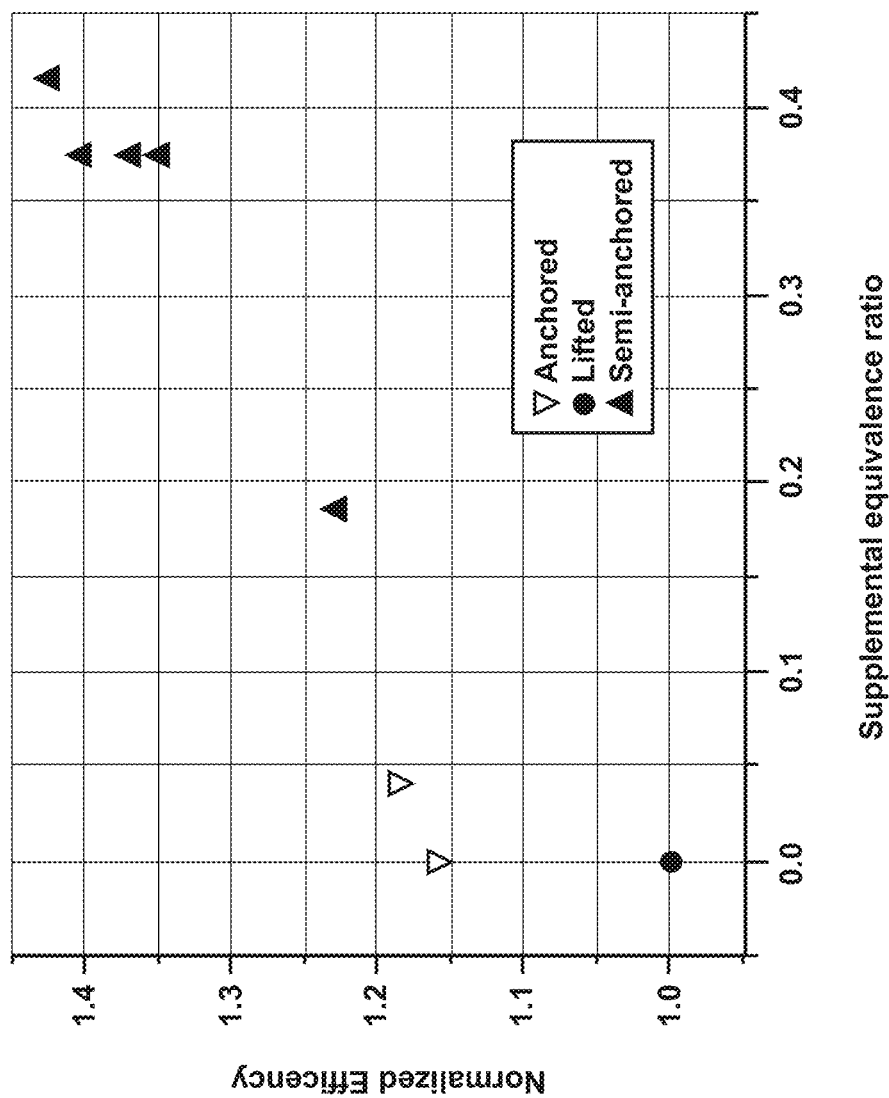
FIG. 7 is a plot of capture efficiency vs supplemental equivalence ratio.

Referring now to FIG. 7, provided is a plot of experimentally measured soot normalized deposition efficiency (Normalized Efficiency) as a function of the equivalence ratio $CH_4$ in the additional gas (e.g., the second gas 94) (Supplemental equivalence ratio) for soot jets in an anchored state (i.e., the ignition point 132 is against the burner face 22 of the burner 10), a semi-anchored state (e.g., the ignition point 132 is about 0.5 cm from the burner face 22 of the burner 10) and a lifted state (e.g., the ignition point is greater than 1 cm from the burner face 22 of the burner 10) for 24 slpm of $O_2$ in the additional gas stream. OMCTS was used as the silicon-containing fuel (26 g/min) and was supplied with $O_2$ (8.5 slpm) in the fume tube (e.g. fume tube 52). The lifted state is generated by not including a fuel in the additional gas. All the anchored and semi-anchored states contained 24 slpm of $O_2$ in the additional gas stream except the lifted state which contained 16 slpm of $O_2$ and is similar to the flame in comparative example 1. The deposition efficiency and normalized deposition efficiency were computed from the following equations:

$$\text{Deposition efficiency} = \left( \frac{\text{Total Mass of Soot } (SiO_2) \text{ deposited on Target}}{(\text{Total } OMCTS \text{ flowed}) \left( \frac{0.811 \text{ g } SiO_2}{\text{g } OMCTS} \right)} \right)$$

$$\text{Normalized Deposition efficiency} = \left( \frac{\text{Deposition Efficiency}}{(\text{Deposition efficiency of a flame similar to comparative example 1})} \right)$$

As can be seen in FIG. 7, the lifted state leads to a dispersed soot jet and accordingly has a low capture efficiency. The addition of the additional $CH_4$ causes the flame to move to the semi-anchored state which increases its efficiency as the soot jet is more focused. Further, by causing the soot stream to reach the anchored state, the soot particles are deposited on the surface of the burner 10 and accumulate as debris, which is an undesirable side effect requiring additional process maintenance. In the semi-anchored state, high soot capture efficiency is achieved without buildup of debris on the burner or surfaces of the combustion apparatus. It will be obvious to those skilled in the art that increases in capture efficiency and concomitant reductions in stray or unwanted soot particles on surfaces and components other than the optical preform may additionally vary depending on conditions of the soot deposition configuration. For example, the capture efficiency for a given set of flow conditions described previously herein may be additionally influenced by the number of burners in a plurality of burners, the distance between such burners, the orientation of the preform, e.g., horizontal vs. vertical, the orientation of such burners in relation to the soot deposition target, and the direction of the flame and the resultant generated soot particles in relation to gravity and buoyant forces. Hence the deposition efficiency is appropriately stated in normalized terms as shown in FIG. 7.

Aspect 1 of the description is:
A method of producing soot, comprising:
combusting a first fuel stream and a first oxidizer at a burner face;
combusting a second fuel stream and a second oxidizer at the burner face, wherein the second fuel stream and the second oxidizer are premixed in advance of the burner face and a second equivalence ratio of the second fuel stream and the second oxidizer is less than about 1; and
combusting a silicon-containing fuel into a plurality of soot particles, wherein the second fuel stream and the second oxidizer are combusted between the first fuel stream and the silicon-containing fuel.

Aspect 2 of the description is:
The method of Aspect 1, wherein the first fuel stream comprises a hydrocarbon, $H_2$, CO, or combination thereof.

Aspect 3 of the description is:
The method of Aspect 1, wherein the first fuel stream comprises $CH_4$.

Aspect 4 of the description is:
The method of any of Aspects 1-3, wherein the first fuel stream lacks a silicon-containing fuel.

Aspect 5 of the description is:
The method of any of Aspects 1-4, wherein the first fuel stream and the first oxidizer are premixed in advance of the burner face.

Aspect 6 of the description is:
The method of any of Aspects 1-5, wherein a first equivalence ratio of the first fuel stream and the first oxidizer is greater than about 1.

Aspect 7 of the description is:
The method of Aspect 6, wherein the first equivalence ratio is 1.6 or greater.

Aspect 8 of the description is:
The method of Aspect 6, wherein the first equivalence ratio is from about 2 to about 3.

Aspect 9 of the description is:
The method of Aspect 6, wherein the first equivalence ratio is about 2.67.

Aspect 10 of the description is:
The method of any of Aspects 1-9, wherein the second fuel stream comprises a hydrocarbon, $H_2$, CO, or a combination thereof.

Aspect 11 of the description is:
The method of any of Aspects 1-10, wherein the second fuel stream lacks a silicon-containing fuel.

Aspect 12 of the description is:
The method of any of Aspects 1-11, wherein the second fuel stream differs in composition from the first fuel stream.

Aspect 13 of the description is:
The method of any of Aspects 1-12, wherein the second equivalence ratio is from about 0.1 to about 0.5.

Aspect 14 of the description is:

The method of any of Aspects 1-12, wherein the second equivalence ratio is from about 0.2 to about 0.4.

Aspect 15 of the description is:

The method of any of Aspects 1-12, wherein the second equivalence ratio is about 0.33.

Aspect 16 of the description is:

The method of any of Aspects 1-15, wherein a first burning velocity of the combusted first fuel and first oxidizer is from about 10 cm/s to about 75 cm/s.

Aspect 17 of the description is:

The method of any of Aspects 1-15, wherein a first burning velocity of the combusted first fuel and first oxidizer is from about 20 cm/s to about 50 cm/s.

Aspect 18 of the description is:

The method of any of Aspects 1-15, wherein a first burning velocity of the combusted first fuel and first oxidizer is from about 30 cm/s to about 50 cm/s.

Aspect 19 of the description is:

The method of any of Aspects 1-15, wherein a second burning velocity of the combusted second fuel and second oxidizer is from about 50 cm/s to about 225 cm/s.

Aspect 20 of the description is:

The method of any of Aspects 1-15, wherein a second burning velocity of the combusted second fuel and second oxidizer is from about 100 cm/s to about 175 cm/s.

Aspect 21 of the description is:

The method of any of Aspects 1-15, wherein a second burning velocity of the combusted second fuel and second oxidizer is from about 125 cm/s to about 150 cm/s.

Aspect 22 of the description is:

The method of any of Aspects 1-21, wherein the silicon-containing fuel is combusted into the plurality of soot particles at a lift-off distance away from the burner face and the silicon-containing fuel is passed through a fume tube aperture at the burner face.

Aspect 23 of the description is:

The method of Aspect 22, wherein a lift-off ratio of the lift-off distance divided by a longest linear dimension of the fume tube aperture is from about 0.33 to about 8.

Aspect 24 of the description is:

The method of Aspect 23, wherein the lift-off ratio is from about 1 to about 4.

Aspect 25 of the description is:

The method of Aspect 23, wherein the lift-off ratio is from about 2.0 to about 2.5.

Aspect 26 of the description is:

The method of any of Aspects 1-25, wherein the first fuel stream and the first oxidizer are surface mixed at the burner face.

Aspect 27 of the description is:

The method of any of Aspects 1-26, further comprising:
directing a shield gas between the silicon-containing fuel and the combustion of the second fuel stream and the second oxidizer, the shield gas comprising an inert gas.

Aspect 28 of the description is:

The method of Aspect 27, wherein the shield gas further comprises a non-silicon-containing fuel.

Aspect 29 of the description is the method of Aspect 28, wherein the shield gas further comprises an oxidizer.

Aspect 30 of the description is:

The method of any of Aspects 1-29, further comprising:
combusting a third fuel stream at the burner face between the second fuel stream and the silicon-containing fuel, the third fuel stream comprising a non-silicon-containing fuel and lacking a silicon-containing fuel.

Aspect 31 of the description is:

A method of producing soot, comprising:
combusting a first fuel stream and a first oxidizer at of a burner face;
combusting a second fuel stream and a second oxidizer at the burner face; and
combusting a silicon-containing fuel into a plurality of silica soot particles at a lift-off distance away from the burner face, wherein the lift-off distance is from about 0.1 cm to about 0.8 cm from the burner face and wherein the second fuel stream is combusted between the first fuel stream and the silicon-containing fuel.

Aspect 32 of the description is:

The method of Aspect 31, wherein the lift-off distance is from about 0.1 cm to about 0.7 cm from the burner face.

Aspect 33 of the description is:

The method of Aspect 31, wherein the lift-off distance is from about 0.3 cm to about 0.7 cm from the burner face.

Aspect 34 of the description is:

The method of Aspect 31, wherein the lift-off distance is from about 0.4 cm to about 0.6 cm from the burner face.

Aspect 35 of the description is:

The method of Aspect 31, wherein the lift-off distance is about 0.5 cm from the burner face.

Aspect 36 of the description is:

The method of any of Aspects 31-35, wherein the first fuel stream comprises a hydrocarbon, $H_2$, CO, or combination thereof.

Aspect 37 of the description is:

The method of any of Aspects 31-35, wherein the first fuel stream comprises $CH_4$.

Aspect 38 of the description is:

The method of any of Aspects 31-37, wherein the first fuel stream lacks a silicon-containing fuel.

Aspect 39 of the description is:

The method of any of Aspects 31-38, wherein the first fuel stream and the first oxidizer are premixed in advance of the burner face.

Aspect 40 of the description is:

The method of any of Aspects 31-39, wherein the second fuel stream comprises a hydrocarbon, $H_2$, CO, or a combination thereof.

Aspect 41 of the description is:

The method of any of Aspects 31-39, wherein the second fuel stream lacks a silicon-containing fuel.

Aspect 42 of the description is:

The method of any of Aspects 31-41, wherein the second fuel stream differs in composition from the first fuel stream.

Aspect 43 of the description is:

The method of any of Aspects 31-42, wherein the first fuel stream and the first oxidizer are surface mixed at the burner face.

Aspect 44 of the description is:

The method of any of Aspects 31-43, further comprising:
directing a shield gas between the silicon-containing fuel and the combustion of the second fuel stream and the second oxidizer, the shield gas comprising an inert gas.

Aspect 45 of the description is:

The method of Aspect 44, wherein the shield gas further comprises a non-silicon-containing fuel.

Aspect 46 is:

The method of Aspect 45, wherein the shield gas further comprises an oxidizer.

Aspect 47 of the description is:

The method of any of Aspects 31-46, further comprising:
combusting a third fuel stream at the burner face between the second fuel stream and the silicon-containing fuel, the third fuel stream comprising a non-silicon-containing fuel and lacking a silicon-containing fuel.

Aspect 48 of the description is:

A method of producing soot, comprising:

combusting a first fuel stream and a first oxidizer at a burner face, wherein a first equivalence ratio of the first fuel stream and the first oxidizer is from about 1.6 to about 4;

combusting a second fuel stream and a second oxidizer at the burner face, wherein a second equivalence ratio of the second fuel stream and the second oxidizer is from about 0.1 to about 0.5; and combusting a silicon-containing fuel into a plurality of silica soot particles at a lift-off distance away from the burner face, wherein the lift-off distance is from about 0.1 cm to about 0.8 cm from the burner face.

Aspect 49 of the description is:

The method of Aspect 48, wherein the silicon-containing fuel comprises at least one of octamethylcyclotetrasiloxane, decamethylcyclopentasiloxane, dodecamethylcyclohexasiloxane, hexamethylcyclotrisiloxane, hexamethyldisiloxane, octamethyltrisiloxane, decamethyltetrasiloxane and dodecamethylpentasiloxane.

Aspect 50 of the description is:

The method of Aspect 48 or 49, wherein at least one of the first fuel stream and the second fuel stream comprises $CH_4$.

Aspect 51 of the description is:

The method of any of Aspects 48-50, wherein the combustion of the second fuel and the second oxidizer occurs between the combustion of the first fuel and the combustion of the silicon-containing fuel from one another.

Aspect 52 of the description is:

The method of any of Aspects 48-51, wherein a first burning velocity of the combusted first fuel and first oxidizer is from about 10 cm/s to about 75 cm/s and a second burning velocity of the combusted second fuel and second oxidizer is from about 50 cm/s to about 225 cm/s.

Aspect 53 of the description is:

The method of any of Aspects 48-51, wherein a first burning velocity of the combusted first fuel and first oxidizer is from about 20 cm/s to about 50 cm/s and a second burning velocity of the combusted second fuel and second oxidizer is from about 100 cm/s to about 175 cm/s.

Aspect 54 of the description is:

The method of any of Aspects 48-51, wherein a first burning velocity of the combusted first fuel and first oxidizer is from about 30 cm/s to about 50 cm/s and a second burning velocity of the combusted second fuel and second oxidizer is from about 125 cm/s to about 150 cm/s.

Aspect 55 of the description is:

The method of any of Aspects 48-54, further comprising:

depositing a portion of the silica soot particles on a substrate.

Aspect 56 of the description is:

The method of any of Aspects 48-55, wherein the silicon-containing fuel is combusted under a silicon equivalence ratio of from about 2 to about 4.

Aspect 57 of the description is:

The method of any of Aspects 48-55, wherein the silicon-containing fuel is combusted under a silicon equivalence ratio of from about 2.67 to about 4.

Aspect 58 of the description is:

The method of any of Aspects 48-57, wherein the first fuel stream lacks a silicon-containing fuel.

Aspect 59 of the description is:

The method of any of Aspects 48-58, wherein the first fuel stream and the first oxidizer are premixed in advance of the burner face.

Aspect 60 of the description is:

The method of any of Aspects 48-59, wherein the second fuel stream lacks a silicon-containing fuel.

Aspect 61 of the description is:

The method of any of Aspects 48-60, wherein the second fuel stream differs in composition from the first fuel stream.

Aspect 62 of the description is:

The method of any of Aspects 48-61, wherein the first fuel stream and the first oxidizer are surface mixed at the burner face.

Aspect 63 of the description is:

The method of any of Aspects 48-62, further comprising:

directing a shield gas between the silicon-containing fuel and the combustion of the second fuel stream and the second oxidizer, the shield gas comprising an inert gas.

Aspect 64 of the description is:

The method of Aspect 63, wherein the shield gas further comprises a non-silicon-containing fuel.

Aspect 65 of the description is:

The method of Aspect 64, wherein the shield gas further comprises an oxidizer.

Aspect 66 of the description is:

The method of any of Aspects 48-65, further comprising:

combusting a third fuel stream at the burner face between the second fuel stream and the silicon-containing fuel, the third fuel stream comprising a non-silicon-containing fuel and lacking a silicon-containing fuel.

Aspect 67 of the description is:

A flame comprising the combustion product of an organosilicon compound, the flame having an ignition point situated at a lift-off distance from a face of a burner, the lift-off distance being in the range from 0.1 cm-0.8 cm.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise.

What is claimed is:

1. A method of producing soot, comprising:

combusting a first fuel stream and a first oxidizer at a burner face;

combusting a second fuel stream and a second oxidizer at the burner face, wherein the second fuel stream differs in composition from the first fuel stream, and wherein the second fuel stream and the second oxidizer are premixed in advance of the burner face and a second equivalence ratio of the second fuel stream and the second oxidizer is less than about 1; and combusting a silicon-containing fuel into a plurality of soot particles, wherein the second fuel stream and the second oxidizer are combusted between the first fuel stream and the silicon-containing fuel, and wherein the silicon-containing fuel comprises at least one of octamethylcyclotetrasiloxane (OMCTS), decamethylcyclopentasiloxane, dodecamethylcyclohexasiloxane, hexamethylcyclotrisiloxane, hexamethyldisiloxane, octamethyltrisiloxane, decamethyltetrasiloxane, and dodecamethylpentasiloxane.

2. The method of claim 1, wherein the first fuel stream lacks a silicon-containing fuel.

3. The method of claim 1, wherein the first fuel stream and the first oxidizer are premixed in advance of the burner face.

4. The method of claim 1, wherein a first equivalence ratio of the first fuel stream and the first oxidizer is greater than about 1.

5. The method of claim 4, wherein the first equivalence ratio is 1.6 or greater.

6. The method of claim 1, wherein the second fuel stream lacks a silicon-containing fuel.

7. The method of claim 1, wherein the second equivalence ratio is from about 0.1 to about 0.5.

8. The method of claim 1, wherein a first burning velocity of the combusted first fuel and first oxidizer is from about 10 cm/s to about 75 cm/s.

9. The method of claim 1, wherein a second burning velocity of the combusted second fuel and second oxidizer is from about 50 cm/s to about 225 cm/s.

10. The method of claim 1, wherein the first fuel stream and the first oxidizer are surface mixed at the burner face.

11. The method of claim 1, further comprising:
directing a shield gas between the silicon-containing fuel and the combustion of the second fuel stream and the second oxidizer, the shield gas comprising an inert gas.

12. The method of claim 11, wherein the shield gas further comprises a non-silicon-containing fuel and a third oxidizer.

13. The method of claim 1, further comprising:
combusting a third fuel stream at the burner face between the second fuel stream and the silicon-containing fuel, the third fuel stream comprising a non-silicon-containing fuel and the third oxidizer.

14. The method of claim 1, wherein the silicon-containing fuel is combusted into a plurality of soot particles at a lift-off distance away from the burner face, and wherein the lift-off distance is from about 0.1 cm to about 0.8 cm from the burner face.

15. A method of producing soot, comprising:
combusting a first fuel stream and a first oxidizer at a burner face;

combusting a second fuel stream and a second oxidizer at the burner face, wherein the second fuel stream differs in composition from the first fuel stream, and wherein the second fuel stream and the second oxidizer are premixed in advance of the burner face and a second equivalence ratio of the second fuel stream and the second oxidizer is less than about 1; and combusting a silicon-containing fuel into a plurality of soot particles, wherein the second fuel stream and the second oxidizer are combusted between the first fuel stream and the silicon-containing fuel.

16. The method of claim 15, wherein each of the first and second fuel streams lacks a silicon-containing fuel.

17. The method of claim 15, wherein the first fuel stream and the first oxidizer are premixed in advance of the burner face.

18. The method of claim 15, wherein a first equivalence ratio of the first fuel stream and the first oxidizer is greater than about 1.

19. The method of claim 18, wherein the first equivalence ratio is 1.6 or greater.

20. The method of claim 15, wherein the second equivalence ratio is from about 0.1 to about 0.5.

21. The method of claim 15, wherein the silicon-containing fuel comprises at least one of octamethylcyclotetrasiloxane (OMCTS), decamethylcyclopentasiloxane, dodecamethylcyclohexasiloxane, hexamethylcyclotrisiloxane, hexamethyldisiloxane, octamethyltrisiloxane, decamethyltetrasiloxane, and dodecamethylpentasiloxane.

* * * * *